United States Patent
Ito

(10) Patent No.: US 11,804,598 B2
(45) Date of Patent: Oct. 31, 2023

(54) NEGATIVE ELECTRODE ACTIVE MATERIAL AND METHOD FOR PRODUCING THE SAME, NEGATIVE ELECTRODE, AND BATTERY

(71) Applicant: Murata Manufacturing Co., Ltd., Tokyo (JP)

(72) Inventor: Daisuke Ito, Kanagawa (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 15/560,221

(22) PCT Filed: Mar. 10, 2016

(86) PCT No.: PCT/JP2016/001313
§ 371 (c)(1),
(2) Date: Sep. 21, 2017

(87) PCT Pub. No.: WO2016/157743
PCT Pub. Date: Oct. 6, 2016

(65) Prior Publication Data
US 2018/0047981 A1    Feb. 15, 2018

(30) Foreign Application Priority Data
Mar. 31, 2015  (JP) ................. 2015-073205

(51) Int. Cl.
*H01M 4/00* (2006.01)
*H01M 4/48* (2010.01)
(Continued)

(52) U.S. Cl.
CPC ........... *H01M 4/483* (2013.01); *H01M 4/131* (2013.01); *H01M 4/136* (2013.01); *H01M 4/366* (2013.01);
(Continued)

(58) Field of Classification Search
CPC ...... H01M 4/483; H01M 4/582; H01M 4/366; H01M 4/485; H01M 4/131; H01M 4/136;
(Continued)

(56) References Cited

U.S. PATENT DOCUMENTS

2008/0113270 A1   5/2008 Hirose et al.
2012/0107684 A1*  5/2012 Iwamoto ............... H01M 4/134
                                                      427/78

(Continued)

FOREIGN PATENT DOCUMENTS

CN   101060170 A   10/2007
CN   102931376 A    2/2013
(Continued)

OTHER PUBLICATIONS

Machine translation of JP 2014-103019 obtained Jun. 10, 2020 (Year: 2014).*

(Continued)

*Primary Examiner* — Nicholas P D'Aniello
(74) *Attorney, Agent, or Firm* — CHIP LAW GROUP

(57) ABSTRACT

A negative electrode contains a negative electrode active material. A negative electrode active material includes: lithium; a first element consisting of silicon or tin; and a second element consisting of oxygen or fluorine, in which the negative electrode active material contains substantially no compound phase of the first element and the lithium, and contains an amorphous phase containing the first element and the second element, and an ionic bond is formed between the lithium and the second element.

6 Claims, 15 Drawing Sheets

(51) Int. Cl.
*H01M 4/58* (2010.01)
*H01M 4/131* (2010.01)
*H01M 4/136* (2010.01)
*H01M 4/36* (2006.01)
*H01M 4/485* (2010.01)
*H01M 10/0525* (2010.01)
*H01M 4/02* (2006.01)

(52) U.S. Cl.
CPC .......... *H01M 4/485* (2013.01); *H01M 4/582* (2013.01); *H01M 10/0525* (2013.01); *H01M 2004/027* (2013.01); *H01M 2220/10* (2013.01); *H01M 2220/20* (2013.01); *H01M 2220/30* (2013.01)

(58) Field of Classification Search
CPC ......... H01M 10/0525; H01M 2220/30; H01M 2004/027; H01M 2220/10; H01M 2220/20
See application file for complete search history.

(56) References Cited

U.S. PATENT DOCUMENTS

| | | | |
|---|---|---|---|
| 2015/0349340 A1 | 12/2015 | Hirose et al. | |
| 2016/0233484 A1* | 8/2016 | Hirose | H01M 4/131 |
| 2018/0198158 A1* | 7/2018 | Kamo | H01M 4/386 |

FOREIGN PATENT DOCUMENTS

| | | | |
|---|---|---|---|
| JP | 2887632 B2 | | 4/1999 |
| JP | 2997741 B2 | | 1/2000 |
| JP | 3079344 B2 | | 8/2000 |
| JP | 3608904 B2 | | 1/2005 |
| JP | 2005-108826 A | | 4/2005 |
| JP | 2005235589 A | * | 9/2005 |
| JP | 2007-257867 A | | 10/2007 |
| JP | 4193141 B2 | | 12/2008 |
| JP | 2014-103019 A | | 6/2014 |
| JP | 2015-156355 A | | 8/2015 |
| KR | 10-2007-0095218 A | | 9/2007 |
| WO | 2012/132387 A1 | | 10/2012 |
| WO | 2014/188851 A1 | | 11/2014 |
| WO | 2015/025443 A1 | | 2/2015 |

OTHER PUBLICATIONS

M. Mohamedi et al. "Amorphous tin oxide films: preparation and characterization as an anode active material for lithium ion batteries", Electrochimica Acta, vol. 46, Issue 8, 1161-1168 (Year: 2001).*

Machine translation of JP-2005235589-A, obtained Oct. 19, 2021 (Year: 2005).*

Office Action for JP Patent Application No. 2015-073205, dated Jul. 24, 2018, 4 pages of Office Action.

Office Action for JP Patent Application No. 2015-073205, dated Sep. 4, 2018, 04 pages of Office Action and 04 pages of English Translation.

International Search Report and Written Opinion of PCT Application No. PCT/JP2016/001313, dated Jun. 14, 2016, 09 pages of ISRWO.

Al-Ghrabi, et al., "Combinatorial Studies of Si1—xOx as a Potential Negative Electrode Material for Li-Ion Battery Applications", Journal Of The Electrochemical Society, vol. 160, Issue 9, 2013, pp. A1587-A1593.

Obrovac, et al., "Alloy Negative Electrodes for Li-Ion Batteries", Chemical Reviews, vol. 114, Issue 23, 2014, pp. 11444-11502.

Al-Maghrabi et al., "Combinatorial Studies of Si1_xOx as a Potential Negative Electrode Material for Li-Ion Battery Applications", Journal of The Electrochemical Society, 2013, 160 (9), A1587-A1593 pages.

M. N. et al., "Alloy Negative Electrodes for Li-Ion Batteries", Chemical Reviews, American Chemical Society, US, 2014, vol. 114, No. 23, 11491-11502 pages.

Office Action for JP Patent Application No. 2015-073205, dated Dec. 18, 2018, 02 pages of Office Action and 03 pages of English Translation.

Office Action for JP Patent Application No. 2015-073205, dated Mar. 31, 2020, 04 pages of Office Action and 03 pages of English Translation.

Office Action for JP Patent Application No. 2015-073205, dated Sep. 15, 2020, 11 pages of Office Action and 10 pages of English Translation.

* cited by examiner

NEGATIVE ELECTRODE ACTIVE MATERIAL AND METHOD FOR PRODUCING THE SAME, NEGATIVE ELECTRODE, AND BATTERY

CROSS REFERENCE TO RELATED APPLICATIONS

This application is a U.S. National Phase of International Patent Application No. PCT/JP2016/001313 filed on Mar. 10, 2016, which claims priority benefit of Japanese Patent Application No. JP 2015-073205 filed in the Japan Patent Office on Mar. 31, 2015. Each of the above-referenced applications is hereby incorporated herein by reference in its entirety.

TECHNICAL FIELD

The present technology relates to a negative electrode active material and a method for producing the same, a negative electrode, and a battery.

BACKGROUND ART

In recent years, there has been a strong need for a lithium-ion secondary battery to have a higher capacity. As a negative electrode active material having a higher capacity than a carbon material, a silicon (Si)-containing material or a tin (Sn)-containing material is being developed. However, use of a Si- or Sn-containing material presents a problem of a cycle characteristic.

An example of Si- or Sn-containing material having a relatively good cycle characteristic is a silicon oxide ($SiO_x$). $SiO_x$ is advantageous in that stability of the bond between oxygen and Si (Si—O—Si bond) can reduce or eliminate structural collapse due to expansion and shrinkage. On the other hand, $SiO_x$ has a significant disadvantage in that the oxygen causes a Li-trapping phenomenon, which reduces the amount of Li released from the silicon oxide (this is referred to as "Li loss") during discharging. For example, silicon oxide undergoes Li loss of nearly the same molar ratio as that of the oxygen, and the initial efficiency is thus reduced.

A Si-containing material to which oxygen has been introduced has a disadvantage described above, which counteracts the advantage of the introduction of oxygen. Therefore, Li loss is almost unavoidable in a Si-containing material to which oxygen has been introduced. Thus, a technology to compensate for Li loss is being studied. Examples of technology used to compensate for Li loss include previously introducing lithium into a Si-containing material or into an electrode containing a Si-containing material (this is referred to as "Li pre-doping"), and the like. Similarly, Li pre-doping or the like is also performed on a Sn-containing material.

For example, in Patent Documents 1 to 3, a material produced by introducing lithium into a negative electrode active material (complex oxide formed with lithium and tin, lithium-containing silicon oxide, etc.) is used. In Patent Document 4, SiO, SnO, or the like is immersed in a lithium-dissolved liquid ammonium solution to produce a lithium-containing compound.

In Patent Document 5, SiO, SnO, or the like is immersed in a solution produced by addition of lithium and a polycyclic aromatic compound to chain monoether to cause SiO, SnO, or the like to store lithium. In Patent Document 6, silicon particles are held in a negative electrode current collector, and lithium is then vapor deposited and stored to form a precursor layer, followed by heating of the precursor layer, thus to sinter or bind together active material particles containing lithium and silicon.

CITATION LIST

Patent Document

Patent Document 1: Japanese Patent No. 2887632
Patent Document 2: Japanese Patent No. 2997741
Patent Document 3: Japanese Patent No. 3079344
Patent Document 4: Japanese Patent No. 3608904
Patent Document 5: Japanese Patent Application Laid-Open No. 2005-108826
Patent Document 6: Japanese Patent No. 4193141

SUMMARY OF THE INVENTION

Problems to be Solved by the Invention

It is an object of the present technology to provide a negative electrode active material and a method for producing the same, a negative electrode, and a battery, each capable of improving a cycle characteristic of a battery.

Solutions to Problems

To solve the problem, a first technology is a negative electrode active material including: lithium; a first element consisting of silicon or tin; and a second element consisting of oxygen or fluorine, in which the negative electrode active material contains substantially no compound phase of the first element and the lithium, and contains an amorphous phase containing the first element and the second element, and an ionic bond is formed between the lithium and the second element.

A second technology is a negative electrode having a negative electrode active material layer containing a negative electrode active material. The negative electrode active material contains lithium, a first element consisting of silicon or tin, and a second element consisting of oxygen or fluorine. The negative electrode active material contains substantially no compound phase of the first element and lithium, and contains an amorphous phase containing the first element and the second element, and an ionic bond is formed between lithium and the second element.

A third technology is a battery including a positive electrode, a negative electrode, and an electrolyte. The negative electrode has a negative electrode active material layer containing a negative electrode active material. The negative electrode active material contains lithium, a first element consisting of silicon or tin, and a second element consisting of oxygen or fluorine. The negative electrode active material contains substantially no compound phase of the first element and lithium, and contains an amorphous phase containing the first element and the second element, and an ionic bond is formed between lithium and the second element.

A fourth technology is a method for producing a negative electrode active material, including obtaining Li-doped, Si- or Sn-containing particles by doping, with lithium, Si- or Sn-containing particles containing a first element consisting of silicon or tin and a second element consisting of oxygen or fluorine, and performing heat treatment on the Li-doped, Si- or Sn-containing particles. The heat treatment is performed at 300° C. or above and below 600° C.

Effects of the Invention

The present technology can provide a novel negative electrode active material capable of improving a cycle characteristic of a battery, and a method for producing the same; and similarly, can provide a battery capable of improving a cycle characteristic of the battery.

MODE FOR CARRYING OUT THE INVENTION

Figure 1:
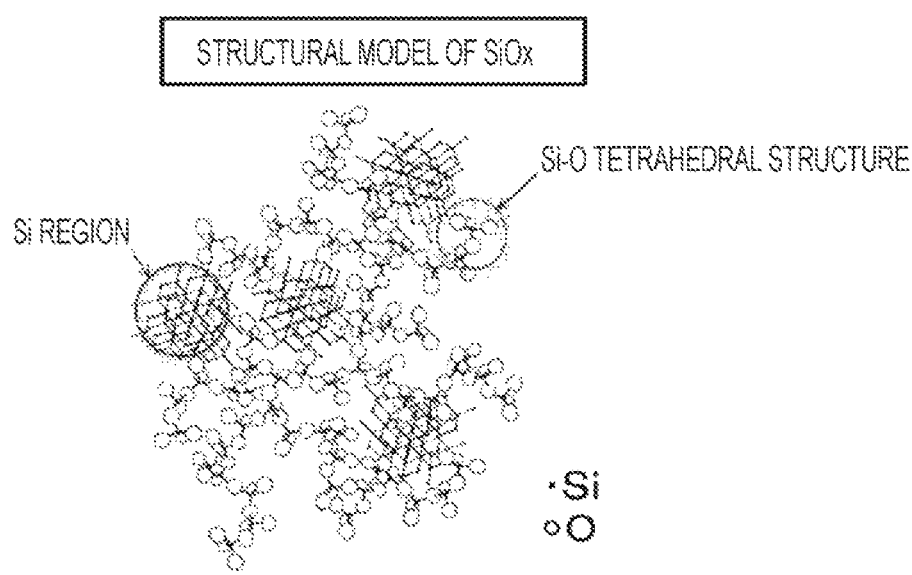
FIG. 1 is a schematic diagram illustrating one example of structural model of $SiO_x$.

The embodiments of the present technology are described in the order set forth below:
1 First embodiment (a case of Si- or Sn-containing material)
2 Second embodiment (a case of cylindrical cell)
3 Third embodiment (a case of flattened cell)
4 Fourth embodiment (a case of battery pack and electronic device)
5 Fifth embodiment (a case of electrical power storage system)
6 Sixth embodiment (a case of electrically-powered vehicle)

1. First Embodiment

[Configuration of Si- or Sn-Containing Material]

One example of the configuration of the Si- or Sn-containing material according to a first embodiment of the present technology will be described below.

The Si- or Sn-containing material according to the first embodiment is suitable for use as a negative electrode active material, and includes lithium (Li), a first element consisting of silicon (Si) or tin (Sn), and a second element consisting of oxygen (O) or fluorine (F). This Si- or Sn-containing material contains substantially no compound phase of the first element and lithium, and contains an amorphous phase containing the first element and the second element, and an ionic bond is formed between lithium and the second element. Note that a material can be said to "contain substantially no compound phase of the first element and lithium" in a case where, in XPS analysis, a peak due to bond component between the first element and lithium is not observed or otherwise only very weakly observed. This negative electrode active material is for use, for example, in a non-aqueous electrolyte secondary battery, such as a lithium-ion secondary battery.

Examples of preferred Si- or Sn-containing material include a Si-containing material containing lithium, silicon as the first element, and oxygen as the second element; and one containing lithium, tin as the first element, and oxygen as the second element.

The Si-containing material is Li-containing $SiO_x$ obtained by performing Li pre-doping on $SiO_x$, followed by heat treatment at a predetermined temperature. $SiO_x$ denotes silicon oxide. The valence is represented by x because of possible deviation from stoichiometry. The value of x typically falls within a range of, for example, $0.33<x<2$. The term Li pre-doping refers to a process of previously introducing lithium into $SiO_x$ that will be used as the negative electrode active material. Li pre-doping is aimed at previously attaching lithium to oxygen that serves as an irreversible capacity-related site, and Li pre-doping is performed to prevent reduction in the reversible capacity. The content of lithium relative to the total content of the silicon, oxygen, and lithium is preferably in a range of, for example, from 10 atomic percent (at %) to 45 at %, and more preferably 10 at % or more and less than 34 at %.

The Sn-containing material is Li-containing $SnO_y$, obtained by, for example, performing Li pre-doping on $SnO_y$, followed by heat treatment at a predetermined temperature. $SnO_y$ denotes tin oxide. The valence is represented by y because of possible deviation from stoichiometry. The value of y typically falls within a range of, for example, $0.33<x<2$. The content of lithium relative to the total content of the tin, oxygen, and lithium is preferably in a range of, for example, from 10 at % to 45 at %, and more preferably 10 at % or more and less than 34 at %.

FIG. 1 illustrates one example of structural model of $SiO_x$. The structure of $SiO_x$ includes a region containing silicon on a nanometer scale, and a region containing silicon and oxygen. In $SiO_x$, portions containing silicon and oxygen are in an amorphous state or in a state in which an amorphous phase and a crystalline phase coexist, thus including a $SiO_4$ tetrahedral structure. In SiO$_x$, Si regions are crystalline. A crystalline phase has, for example, a crystalline structure of silicon.

Figure 2:
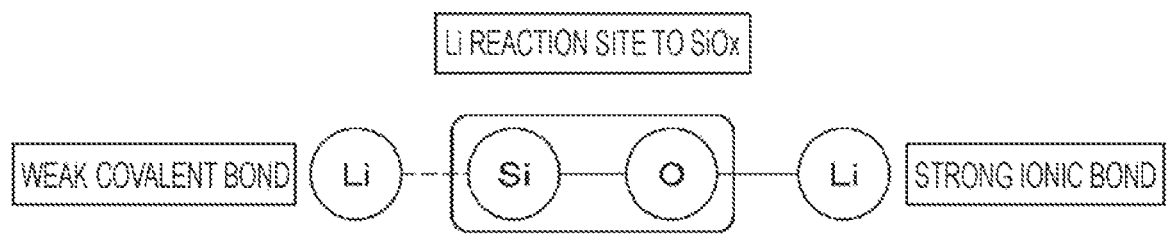
FIG. 2 is a schematic diagram for explaining a Li reaction site of $SiO_x$.

As shown in FIG. 2, a reaction site to lithium in SiO$_x$ is present on a silicon or oxygen atom. A silicon atom forms a weak covalent bond (bond similar to a metallic bond) with a lithium atom to provide a charge/discharge-related site, while an oxygen atom forms a strong ionic bond with lithium to provide a trap site (irreversible capacity-related site).

Li pre-doping is a technology aiming at preventing reduction in the reversible capacity by previously attaching lithium to oxygen that serves as a trap site. Examples of Li pre-doping technology include Li metal addition, electrochemical doping (charge method), a thermal reaction method, an organic Li-doping method (immersion method), and the like. Li metal addition is a method that introduces Li metal foil and/or Li metal particles into a battery cell. Electrochemical doping is a method that introduces lithium into an electrode by charging, and then fabricates and completes a battery. A thermal reaction method is a method that mixes lithium and a Si-containing material together, and fires the resultant mixture thus to dope lithium and the Si-containing material with lithium. An organic Li-doping method is a method that immerses a Si-containing material in an organic lithium solution to perform doping with lithium.

However, the Li pre-doping technologies other than the thermal reaction method rely on internal self-diffusion of lithium, and accordingly, a significant amount of lithium bound to silicon also remains. This lithium bound to silicon has a shallow donor binding energy of 33 meV from a semiconductor point of view, diffuses through silicon by interstitial diffusion, and accordingly, easily cleaves the bond to elute even at a room temperature (26 meV). In fact, the Li pre-doping technologies other than the thermal reaction method readily cause leakage of lithium from the Li-doped SiO$_x$ electrode or powder material, causing various deleterious effects, such as embrittlement of the electrode, solidification of mixture slurry for application (referred to as "mixture solidification") caused by reaction with a binder, production of hydrogen caused by reaction with water, etc. These deleterious effects hinder practical usage.

On the contrary, the present technology performs heat treatment at a predetermined temperature after performing Li pre-doping to prevent such Li elution. The purpose of heat treatment is to attach lithium to oxygen. In electrochemical doping and in an organic Li-doping method, although lithium can easily be inserted into SiO$_x$, a lithium ion is likely to hop predominantly across Si sites where a lithium ion can easily move at a room temperature, and should thus be unlikely to reach an oxygen site. On the other hand, in a thermal reaction method, insertion of metallic Li into silicon requires a high temperature of 600° C. or above (preferably about 800° C.); but, such a high temperature would modify SiO$_x$ itself (crystallization of lithium silicate).

The Li-containing SiO$_x$ of the present technology obtained by the heat treatment described above contains substantially no compound phase of silicon and lithium, contains an amorphous phase containing silicon and oxygen, and includes an ionic bond formed between lithium and oxygen. Note that a material can be said to "contain substantially no compound phase of silicon and lithium" in a case where, in XPS analysis, a peak due to bond component between silicon and lithium is not observed or otherwise only very weakly observed. The Li-containing SnO$_x$ of the present technology contains substantially no compound phase of tin and lithium, contains an amorphous phase containing tin and oxygen, and includes an ionic bond formed between lithium and oxygen.

The Si- or Sn-containing material is in powder form, and may be used as an active material. The Si- or Sn-containing material contains lithium in a stable manner, and is therefore easily handleable in air. Note that an aggregation of multiple particles is referred to as "powder material" or "powder." In this case, a Si- or Sn-containing particle may be either a primary or secondary particle. Examples of the shape of the particles include a spherical, an ellipsoidal, a needle-like, a plate-like, a flake-like, a tubular, a wire-like, a bar-like (rod-like), an irregular, and other shapes, but the shape of the particles is not particularly limited to these shapes. Note that particles having two or more shapes may also be used in combination. Herein, a spherical shape includes, not only a truly spherical shape, but also a shape caused by slightly flattening or distorting a true sphere, a true sphere having surface irregularities, a shape having these shapes in combination, and the like. An ellipsoidal shape includes, not only an exactly ellipsoidal shape, but also a shape caused by slightly flattening or distorting an exactly ellipsoidal shape, an exactly ellipsoidal shape having surface irregularities, a shape having these shapes in combination, and the like. The particles may also be arranged so as to be embedded in another material. For example, examples of arrangement of the particles include a structure in which Si- or Sn-containing particles are embedded in carbon, an arrangement in which Si- or Sn-containing particles are embedded in a porous, electric conductor (carbon, metal, electrically-conductive (hereinafter referred to simply as conductive) ceramic, metal-coated porous material), and the like.

A Si- or Sn-containing material may have a coating portion covering at least a portion of a particle surface. The coating portion contains at least one of the following: carbon, a hydroxide, an oxide, a carbide, a nitride, a fluoride, a hydrocarbon compound, and an organic polymer compound; or may be other material.

[Method for Producing Si- or Sn-Containing Material]

A method for producing the Si- or Sn-containing material according to the first embodiment includes performing Li pre-doping on SiO$_x$ or SnO$_y$ particles, and then performing heat treatment at a predetermined temperature. The present technology inserts lithium into SiO$_x$ or SnO$_y$ (dopes SiO$_x$ or SnO$_y$ with lithium) by using an electrochemical or organic Li-doping method under a condition that prevents occurrence of a change in the structure thereof, and then allows lithium to diffuse again using low temperature heat treatment, thus to attach the lithium to oxygen.

It is thought that high bondability of lithium to oxygen in nature can prevent Li elution (Li stabilization) without modification of SiO$_x$ by providing a sufficient re-diffusion temperature or diffusion time. In particular, the present technology is effective for Li pre-doping of a powder material, and enables stable handling in air in a case where a Li-pre-doped SiO$_x$ powder material (Si-containing material) or a Li-pre-doped SnO$_y$ powder material is used as an active material.

One example of a method for producing the Si-containing material according to the first embodiment of the present technology will be described below in concrete terms.

(SiO$_x$ Powder Material)

The SiO$_x$ powder material is formed, for example, by mixing Si and SiO$_2$ together, performing high-temperature reduction firing at 1400° C. or above, and the like.

(Li Pre-Doping Step: Organic Li Solution Immersion Method)

First, a solution is prepared in which metallic lithium and a polycyclic aromatic compound (naphthalene or the like) are dissolved in a chain ether compound (N-butyl methyl ether or the like). Next, $SiO_x$ powder is fed into this solution to effect reaction. After the reaction, the resultant is dried to yield Li-pre-doped $SiO_x$ powder.

(Heat Treatment Step)

Next, the dried Li-pre-doped $SiO_x$ powder is collected, and is heat treated at a predetermined temperature. After the treatment, by-products on the surface are removed by washing using water, an organic solvent, or the like to yield the Si-containing material.

(Condition of Heat Treatment)

The bonding state of the lithium in the Li-pre-doped $SiO_x$ can be controlled by means of the temperature and the duration time of the heat treatment. In a case where the duration time of the heat treatment is not specified, the temperature of the heat treatment is preferably above 300° C. and below 600° C., and more preferably 400° C. or above and below 600° C.

In a case where the temperature of the heat treatment exceeds 300° C., the proportion of the Li—Si bond component decreases and the proportion of the Si—O—Li bond component increases. In a case where the temperature of the heat treatment reaches or exceeds 600° C., crystallization ($Li_2SiO_3$ crystallization) proceeds, thereby causing a significant change in the internal structure of the Li-pre-doped $SiO_x$. This decreases the cycle characteristic.

Note that in a case where the heat treatment is performed within the temperature range described above, the duration time is preferably, for example, 1 hour or longer. In a case where the heat treatment is performed for 2 hours or longer, the temperature of the heat treatment is preferably 300° C. or above and below 600° C. for a similar reason. In a case where an upper limit of the duration time of the heat treatment is specified, the upper limit of the duration time is preferably, for example, 24 hours or less in a typical case.

In a case where the heat treatment is performed under the heat treatment conditions described above, the content of lithium relative to the total content of silicon, oxygen, and lithium (Li pre-doping level) is preferably 10 at % or more and less than 34 at %. This is because a content of lithium of 34 at % or more causes $SiO_x$ to initiate a reduction reaction, and is thus likely to cause an unstable Si-containing material to be formed.

(Preferred Example of Li Pre-Doping Step)

In the method for producing the Si-containing material described above, the Li pre-doping step may be performed using the naphthalene catalytic cycle method described below.

(Naphthalene Catalytic Cycle Method)

First, a solution is prepared in which naphthalene is dissolved in tert-butyl ether. Next, metallic Li foil and $SiO_x$ are fed into this solution to effect reaction. After the reaction, the resultant is dried to yield Li-pre-doped $SiO_x$ powder.

Details of the reaction in this naphthalene catalytic cycle method are described below.

$$C_{10}H_8 + Li \rightarrow [C_{10}H_8]^- Li^+ \quad (1)$$

$$[C_{10}H_8]^- Li^+ + SiO_x \rightarrow C_{10}H_8 + SiO_x{:}Li \text{ (Li-pre-doped } SiO_x) \quad (2)$$

$$Li + SiO_x \rightarrow SiO_x{:}Li \quad (3)$$

First, the synthesis reaction of lithium naphthalenide shown by Equation (1) starts with a reaction in which naphthalene reacts with metallic Li to form lithium naphthalenide ($[C_{10}H_8]^- Li^+$). Contact of the generated lithium naphthalenide with an active material, such as $SiO_x$, causes the $SiO_x$ to be doped with lithium, and causes naphthalene to be regenerated (Equation (2)).

These two reactions can be collectively represented by Equation (3), and can thus be explained using a model in which lithium is transferred from metallic Li to $SiO_x$ in the presence of naphthalene as a catalyst. During these reactions, lithium provides an electron to naphthalene, and thus only weakly coordinates with the naphthalene anion radical. Therefore, lithium can be transferred without electric field. The oxidation-reduction potential thereof is about 0.3 V (vs. $Li/Li^+$), and upon contact with the $SiO_x$, lithium is electrochemically transferred to the $SiO_x$. The naphthalene that has provided lithium may react again with the metallic Li to regenerate lithium naphthalenide, thus forming a catalytic cycle.

In this naphthalene catalytic cycle method, for example, processing of 10 kg of $SiO_x$ still needs the same amount of Li, that is, 780 g (a Li ingot is previously immersed, and Li may be replenished during the course of the process), but the amount of naphthalene required therefor can be reduced to 70 g, which is one hundredth (1/100), and the amount of the solvent required therefor can be reduced to 20 L, which is one twentieth (1/20). In addition, naphthalene and the solvent are collectible and recyclable.

Note that although the method for producing the Si-containing material described above uses the heat treatment after the pre-doping of the $SiO_x$ powder with Li, an electrode contained in $SiO_x$ powder may be produced first, and the heat treatment may be performed after a Li pre-doping step similar to one described above is performed on the electrode containing the $SiO_x$ powder.

[Effect]

According to the first embodiment, a novel Si- or Sn-containing material can be provided that contains lithium, a first element consisting of silicon or tin, and a second element consisting of oxygen or fluorine. This Si- or Sn-containing material is suitable for use as a negative electrode active material. Use of this Si- or Sn-containing material as a negative electrode active material can improve the cycle characteristic of a battery.

In addition, the Si- or Sn-containing material contains lithium in a stable state, and therefore can prevent Li elution. As a result, generation of hydrogen and solidification due to reaction with a binder (binding agent) can be reduced or eliminated during formation of an electrode.

2. Second Embodiment

[Configuration of Battery]

Figure 3:
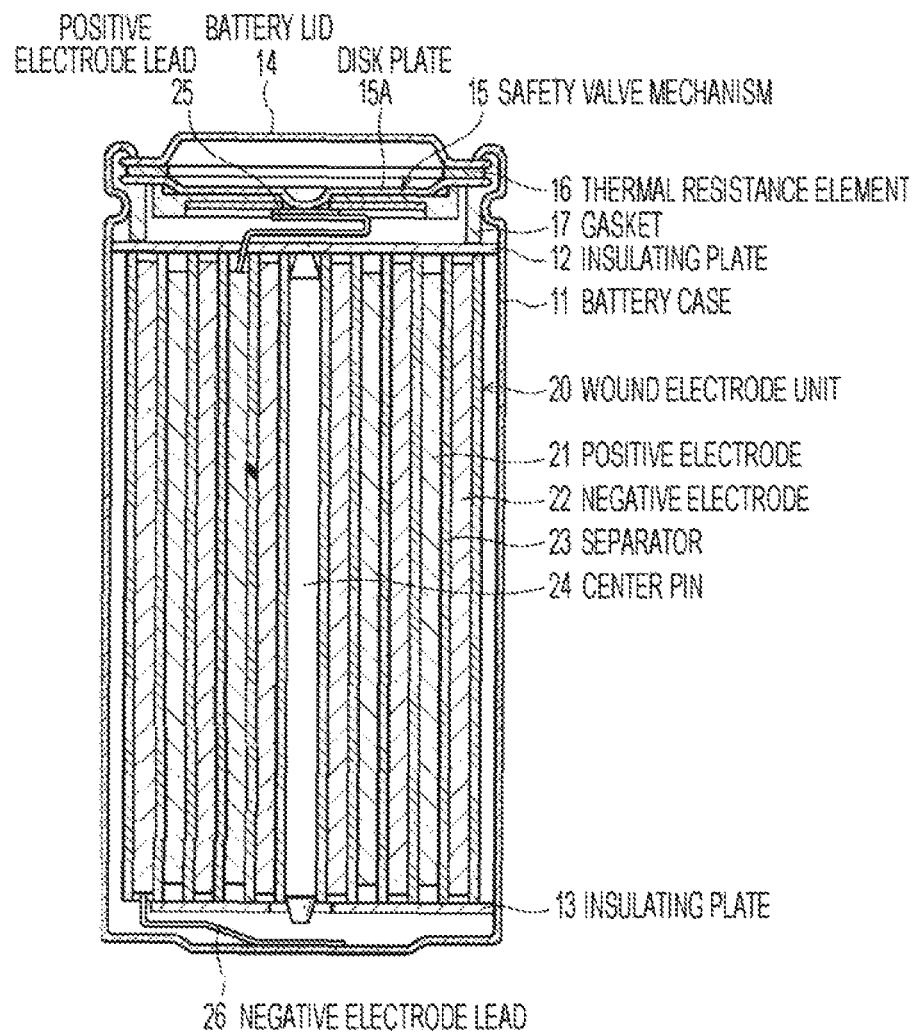
FIG. 3 is a cross-sectional view illustrating one configuration example of a non-aqueous electrolyte secondary battery according to a second embodiment of the present technology.

Referring to FIG. 3, one configuration example of non-aqueous electrolyte secondary battery according to a second embodiment of the present technology will be described below. This non-aqueous electrolyte secondary battery is a so-called lithium-ion secondary battery, the capacity of whose negative electrode, for example, is represented by a capacity component in association with storage and release of lithium, which is the electrode reactant. This type of non-aqueous electrolyte secondary battery is so-called cylindrical type, and includes, in a battery case 11 having a generally hollow cylindrical shape, a wound electrode unit 20 having a pair of a positive electrode 21 having a band shape and a negative electrode 22 having a band shape, stacked one on top of the other and wound together, interposing a separator 23 therebetween. The battery case 11 is formed of nickel (Ni)-plated iron (Fe), having one end closed and the other end open. An electrolytic solution, as an electrolyte, is fed into the battery case 11, and is impregnated into the positive electrode 21, the negative electrode 22, and the separator 23. In addition, a pair of insulating plates 12 and 13 is disposed perpendicularly to the peripheral winding surface so as to interpose the wound electrode unit 20 therebetween.

A battery lid 14, as well as a safety valve mechanism 15 and a thermal resistance element (positive temperature coefficient (PTC) element) 16 both provided inside this battery lid 14, are attached by fastening on the open end of the battery case 11 with a sealing gasket 17 interposed therebetween. With this configuration, the battery case 11 is sealed. The battery lid 14 is formed of, for example, a material similar to the material of the battery case 11. The safety valve mechanism 15 is electrically connected to the battery lid 14, and is designed such that in a case where the internal pressure of the battery exceeds a specific value because of internal short circuit, external heating, or other cause, a disk plate 15A turns inside out to electrically disconnect the battery lid 14 from the wound electrode unit 20. The sealing gasket 17 is formed of, for example, an insulating material, and asphalt is applied on a surface thereof.

For example, a center pin 24 is inserted into the wound electrode unit 20 at the center thereof. A positive electrode lead 25 formed of aluminum (Al) and/or the like is connected to the positive electrode 21, and a negative electrode lead 26 formed of nickel and/or the like is connected to the negative electrode 22, of the wound electrode unit 20. The positive electrode lead 25 is welded to the safety valve mechanism 15, and is thus electrically connected to the battery lid 14, and the negative electrode lead 26 is welded and electrically connected to the battery case 11.

Figure 4:
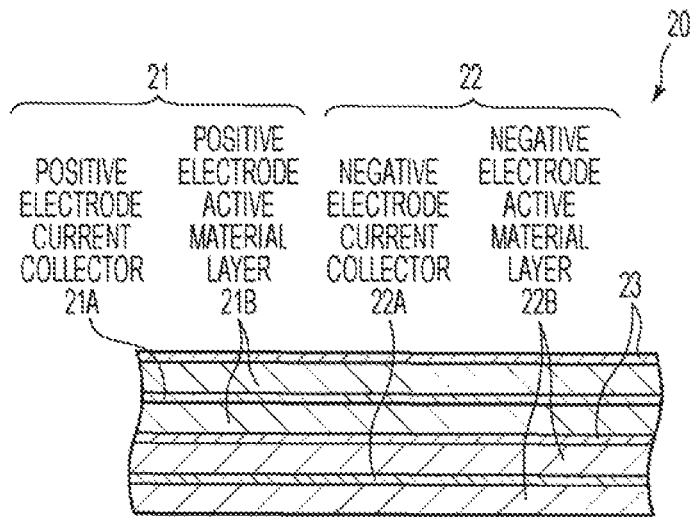
FIG. 4 is a cross-sectional view illustrating with magnification a part of the wound electrode unit shown in FIG. 3.

Referring to FIG. 4, the positive electrode 21, the negative electrode 22, the separator 23, and the electrolytic solution included in the non-aqueous electrolyte secondary battery will be sequentially described below.

(Positive Electrode)

The positive electrode 21 is configured such that, for example, a positive electrode active material layer 21B is provided on each side of a positive electrode current collector 21A. Note that, although not shown, the positive electrode active material layer 21B may be provided only on one side of the positive electrode current collector 21A. The positive electrode current collector 21A is formed of, for example, metal foil such as aluminum foil, nickel foil, or stainless steel foil. The positive electrode active material layer 21B contains, for example, a positive electrode active material capable of storing and releasing lithium, which is an electrode reactant. The positive electrode active material layer 21B may further contain an additive as needed. The additive may be, for example, at least one of a conductive agent and a binding agent.

Examples of suitable positive electrode material capable of storing and releasing lithium include a lithium-containing compound, such as a lithium oxide, a lithium phosphate, a lithium sulfide, or an intercalation compound containing lithium; and these materials may be used in combination of two or more thereof. For a higher energy density, a lithium-containing compound containing lithium, a transition metal element, and oxygen (O) is preferred. Examples of such lithium-containing compound include a lithium complex oxide having a layered halite structure shown in Formula (A), a lithium complex phosphate having an olivine structure shown in Formula (B), and the like. The lithium-containing compound more preferably contains, as a transition metal element, at least one selected from the group consisting of: cobalt (Co), nickel (Ni), manganese (Mn), and iron (Fe). Examples of such lithium-containing compound include a lithium complex oxide having a layered halite structure shown in Formula (C), Formula (D), or Formula (E), a lithium complex oxide having a spinel structure shown in Formula (F), a lithium complex phosphate having an olivine structure shown in Formula (G), and the like; and more specifically, $LiNi_{0.50}Co_{0.20}Mn_{0.30}O_2$, $Li_aCoO_2$ (a≈1), $Li_bNiO_2$ 1), $Li_{c1}Ni_{c2}CO_{1-c2}O_2$ (c1≈1 and 0<c2<1), $Li_{c1}Mn_2O_4$ (d≈1), $Li_eFePO_4$ (e≈1), or the like.

$$Li_pNi_{(1-q-r)}Mn_qM1_rO_{(2-y)}X_z \quad (A)$$

where, in Formula (A), M1 represents at least one of elements selected from group 2 to group 15 of periodic table except nickel (Ni) and manganese (Mn); X represents at least one of group 16 elements and group 17 elements except oxygen (O); and p, q, y, and z are values respectively in ranges of: 0≤p≤1.5, 0≤q≤1.0, 0≤r≤1.0, −0.10≤y≤0.20, and 0≤z≤0.2.

$$Li_aM2_bPO_4 \quad (B)$$

where, in Formula (B), M2 represents at least one of elements selected from group 2 to group 15; and a and b are values respectively in ranges of: 0≤a≤2.0 and 0.5≤b≤2.0.

$$Li_fMn_{(1-g-h)}Ni_gM3_hO_{(2-j)}F_k \quad (C)$$

where, in Formula (C), M3 represents at least one selected from the group consisting of: cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W); and f, g, h, j, and k are values respectively in ranges of: 0.8≤f≤1.2, 0≤g≤0.5, 0≤h≤0.5 (g+h<1), −0.1≤j≤0.2, and 0≤k≤0.1. Note that the lithium composition varies depending on the charge/discharge state, and the value of f represents the value in a completely discharged state.

$$Li_mNi_{(1-n)}M4_nO_{(2-p)} \quad (D)$$

where, in Formula (D), M4 represents at least one selected from the group consisting of: cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); and m, n, p, and q are values respectively in ranges of: 0.8≤m≤1.2, 0.005≤n≤0.5, −0.1≤p≤0.2, and 0≤q≤0.1. Note that the lithium composition varies depending on the charge/discharge state, and the value of m represents the value in a completely discharged state.

$$Li_rCo_{(1-s)}M5_sO_{(2-t)}F_u \quad (E)$$

where, in Formula (E), M5 represents at least one selected from the group consisting of: nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); and r, s, t, and u are values respectively in ranges of: 0.8≤r≤1.2, 0≤s≤0.5, −0.1≤t≤0.2, and 0≤u≤0.1. Note that the lithium composition varies depending on the charge/discharge state, and the value of r represents the value in a completely discharged state.

$$Li_vMn_{2-w}M6_wO_wF_y \quad (F)$$

where, in Formula (F), M6 represents at least one selected from the group consisting of: cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); and v, w, x, and y are values respectively in ranges of: 0.9≤v≤1.1, 0≤w≤0.6, 3.7≤x≤4.1, and 0≤y≤0.1. Note that the lithium composition varies depending on the charge/discharge state, and the value of v represents the value in a completely discharged state.

$$Li_zM7PO_4 \quad (G)$$

where, in Formula (G), M7 represents at least one selected from the group consisting of: cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr); and z is a value in a range of 0.9≤z≤1.1. Note that the lithium composition varies depending on the charge/discharge state, and the value of z represents the value in a completely discharged state.

In addition to those materials, examples of positive electrode material capable of storing and releasing lithium also include inorganic compounds containing no lithium, such as $MnO_2$, $V_2O_5$, $V_6O_{13}$, NiS, and MoS.

The positive electrode material capable of storing and releasing lithium may be other than those described above. Moreover, the positive electrode materials described above byway of example may be used in an arbitrary combination of two or more thereof.

The binding agent is, for example, at least one selected from: resin materials, such as polyvinylidene difluoride (PVdF), polytetrafluoroethylene (PTFE), polyacrylonitrile (PAN), styrene-butadiene rubber (SBR), and carboxymethyl cellulose (CMC); copolymers formed primarily from these resin materials; and the like.

Examples of the conductive agent include carbon materials, such as graphite, carbon black, and Ketjen black; and these materials are used alone or in combination of two or more thereof. Moreover, in addition to carbon materials, a metallic material having electrical conductivity, a conductive polymeric compound, or the like may be used.

(Negative Electrode)

The negative electrode 22 is configured such that, for example, a negative electrode active material layer 22B is provided on each side of a negative electrode current collector 22A. Note that, although not shown, the negative electrode active material layer 22B may be provided only on one side of the negative electrode current collector 22A. The negative electrode current collector 22A is formed of, for example, metal foil such as copper foil, nickel foil, or stainless steel foil.

The negative electrode active material layer 22B contains a negative electrode active material capable of storing and releasing lithium. The negative electrode active material layer 22B may further contain an additive, such as a binding agent and/or a conductive agent, as needed. The negative electrode active material is the Si- or Sn-containing material according to the first embodiment described above.

The binding agent is, for example, at least one selected from: resin materials, such as polyvinylidene difluoride (PVdF), polytetrafluoroethylene (PTFE), polyacrylonitrile (PAN), styrene-butadiene rubber (SBR), and carboxymethyl cellulose (CMC); copolymers formed primarily from these resin materials; and the like. The conductive agent may be a carbon material similar to that for the positive electrode active material layer.

(Separator)

The separator 23 separates the positive electrode 21 from the negative electrode 22 to prevent current short-circuiting caused by contact of both electrodes while allowing lithium ions to pass therethrough. The separator 23 is formed of, for example, a porous film made of a resin material, such as polytetrafluoroethylene, polypropylene, or polyethylene, and may be a laminate of porous films formed of two or more of these resin materials. Among others, a porous film made of a polyolefin has an excellent short-circuit prevention effect, and provides an improvement in battery safety owing to a shutdown effect, and is therefore preferred. Among others, polyethylene provides a shutdown effect in a temperature range of from 100° C. to 160° C., and also has excellent electrochemical stability. Therefore, polyethylene is preferable for the material to form the separator 23. In addition, a material may also be used in which a resin having chemical stability has been copolymerized or blended with polyethylene or polypropylene. Alternatively, the porous film may have a three- or more-layer structure including a polypropylene layer, a polyethylene layer, and a polypropylene layer being sequentially laminated.

Furthermore, the separator 23 may have a resin layer on one side, or on both sides, of the porous film serving as a base member. The resin layer is a porous matrix resin layer carrying an inorganic substance. This configuration can provide oxidation resistance, and can reduce or eliminate degrading of the separator 23. Examples of applicable matrix resin include polyvinylidene difluoride (PVdF), hexafluoropropylene (HFP), polytetrafluoroethylene (PTFE), and the like. Moreover, a copolymer thereof may also be used.

Examples of the inorganic substance may include metals and semiconductors, and oxides and nitrides thereof. Examples of the metal may include aluminum (Al), titanium (Ti), and the like. Examples of the semiconductor may include silicon, boron (B), and the like. In addition, the inorganic substance, preferably, is substantially non-conductive and has a high heat capacity. This is because a high heat capacity is helpful in providing a heat sink against heat generation by a current, and can thus reduce or eliminate thermal runaway of the battery. Examples of such inorganic substance may include oxides and nitrides such as alumina ($Al_2O_3$), boehmite (monohydrate of alumina), talc, boron nitride (BN), aluminum nitride (AlN), titanium dioxide ($TiO_2$), and silicon oxide ($SiO_x$).

The particle size of the inorganic substance is preferably in a range of from 1 nm to 10 μm. An inorganic substance having a particle size less than 1 nm is difficult to obtain, and even if it is available, such inorganic substance will not pay for the cost. An inorganic substance having a particle size more than 10 μm increases the distance between the electrodes, and thus cannot achieve a sufficient amount of active material enclosed in a limited space, resulting in a low battery capacity.

The resin layer may be formed such that, for example, a slurry containing a matrix resin, a solvent, and an inorganic substance is applied on the base member (porous film), which is then passed through a bath of a poor solvent for the matrix resin and of a good solvent for the aforementioned solvent to allow phase separation to occur, followed by drying of the resultant.

Moreover, the puncture resistance of the separator 23 is preferably in a range of from 100 gf to 1000 gf, and more preferably in a range of from 100 gf to 480 gf. This is because a low puncture resistance may cause short circuit, and a high puncture resistance reduces ion conductivity.

Furthermore, the air permeability of the separator 23 is preferably in a range of from 30 sec/100 cc to 1000 sec/100 cc, and more preferably in a range of from 30 sec/100 cc to 680 sec/100 cc. This is because a low air permeability may cause short circuit, and a high air permeability reduces ion conductivity.

Note that the inorganic substance described above may be contained in the porous film that serves as a base member.

(Electrolytic Solution)

The separator 23 is impregnated with an electrolytic solution, which is a liquid electrolyte. The electrolytic solution contains a solvent, and an electrolyte salt dissolved in this solvent. For improvement in battery characteristic, the electrolytic solution may contain a known additive.

Examples of applicable solvent include cyclic carbonate esters, such as ethylene carbonate and propylene carbonate. One of, or a combination of both, in particular, of ethylene carbonate and propylene carbonate is preferably used since the cycle characteristic will be improved.

Moreover, in addition to these cyclic carbonate esters, the solvent is preferably used by mixing a chain carbonate ester, such as diethyl carbonate, dimethyl carbonate, ethyl methyl carbonate, or methyl propyl carbonate since high ion conductivity will be provided.

Furthermore, the solvent preferably contains 2,4-difluoroanisole or vinylene carbonate since use of 2,4-difluoroanisole can increase the discharge capacity, and use of vinylene carbonate can improve the cycle characteristic. Thus, use thereof in combination can improve both the discharge capacity and the cycle characteristic, and such use is therefore preferred.

In addition to these, examples of the solvent include butylene carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxyacetonitrile, 3-methoxypropylonitrile, N,N-dimethylformamide, N-methylpyrrolidinone, N-methyloxazolidinone, N,N-dimethylimidazolidinone, nitromethane, nitroethane, sulfolane, dimethyl sulfoxide, trimethyl phosphate, or the like.

Note that compounds obtained by replacing at least a portion of hydrogen atoms of these non-aqueous solvents each with a fluorine atom may be preferred since reversibility of electrode reaction may be improved depending on the combination of the electrodes.

Examples of the electrolyte salt include lithium salts, which may be used alone or in combination of two or more thereof. Examples of the lithium salt include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, lithium difluoro[oxalato-O,O']borate, lithium bis (oxalate) borate, LiBr, or the like. Among these, $LiPF_6$ is preferred since high ion conductivity can be obtained, and the cycle characteristic can be improved.

In the non-aqueous electrolyte secondary battery having a configuration described above, for example, lithium ions are released from the positive electrode active material layer 21B, travel through the electrolytic solution, and are stored in the negative electrode active material layer 22B during charging. In addition, for example, lithium ions are released from the negative electrode active material layer 22B, travel through the electrolytic solution, and are stored in the positive electrode active material layer 21B during discharging.

[Method for Producing Battery]

Next, one example of a method for producing the non-aqueous electrolyte secondary battery according to the second embodiment of the present technology will be described.

First, for example, a positive electrode active material, a conductive agent, and a binding agent are mixed together to prepare a positive electrode mixture, and this positive electrode mixture is dispersed into a solvent, such as N-methyl-2-pyrrolidone (NMP), to produce a paste-like positive electrode mixture slurry. Next, this positive electrode mixture slurry is applied on the positive electrode current collector 21A, followed by drying out the solvent. Then, compression forming is performed by a roller press machine or the like to form the positive electrode active material layer 21B, and thus the positive electrode 21 is formed.

Also, for example, a negative electrode active material and a binding agent are mixed together to prepare a negative electrode mixture, and this negative electrode mixture is dispersed into a solvent, such as N-methyl-2-pyrrolidone, to produce a paste-like negative electrode mixture slurry. Next, this negative electrode mixture slurry is applied on the negative electrode current collector 22A, followed by drying out the solvent. Then, compression forming is performed by a roller press machine or the like to form the negative electrode active material layer 22B, and thus the negative electrode 22 is formed.

Next, the positive electrode lead 25 is attached to the positive electrode current collector 21A by means of welding or the like, and the negative electrode lead 26 is attached to the negative electrode current collector 22A by means of welding or the like. Next, the positive electrode 21 and the negative electrode 22 are wound with the separator 23 interposed therebetween. Next, an end portion of the positive electrode lead 25 is welded to the safety valve mechanism 15, and an end portion of the negative electrode lead 26 is welded to the battery case 11; then, the wound pair of positive electrode 21 and negative electrode 22 is interposed between the pair of insulating plates 12 and 13, and is placed in the battery case 11. Next, after the positive electrode 21 and the negative electrode 22 are placed in the battery case 11, the electrolytic solution is fed into the battery case 11, and is impregnated into the separator 23. Next, the battery lid 14, the safety valve mechanism 15, and the thermal resistance element 16 are secured by fastening on the open end of the battery case 11 with the sealing gasket 17 interposed therebetween. Thus, the secondary battery shown in FIG. 3 is obtained.

3. Third Embodiment

[Configuration of Battery]

Figure 5:
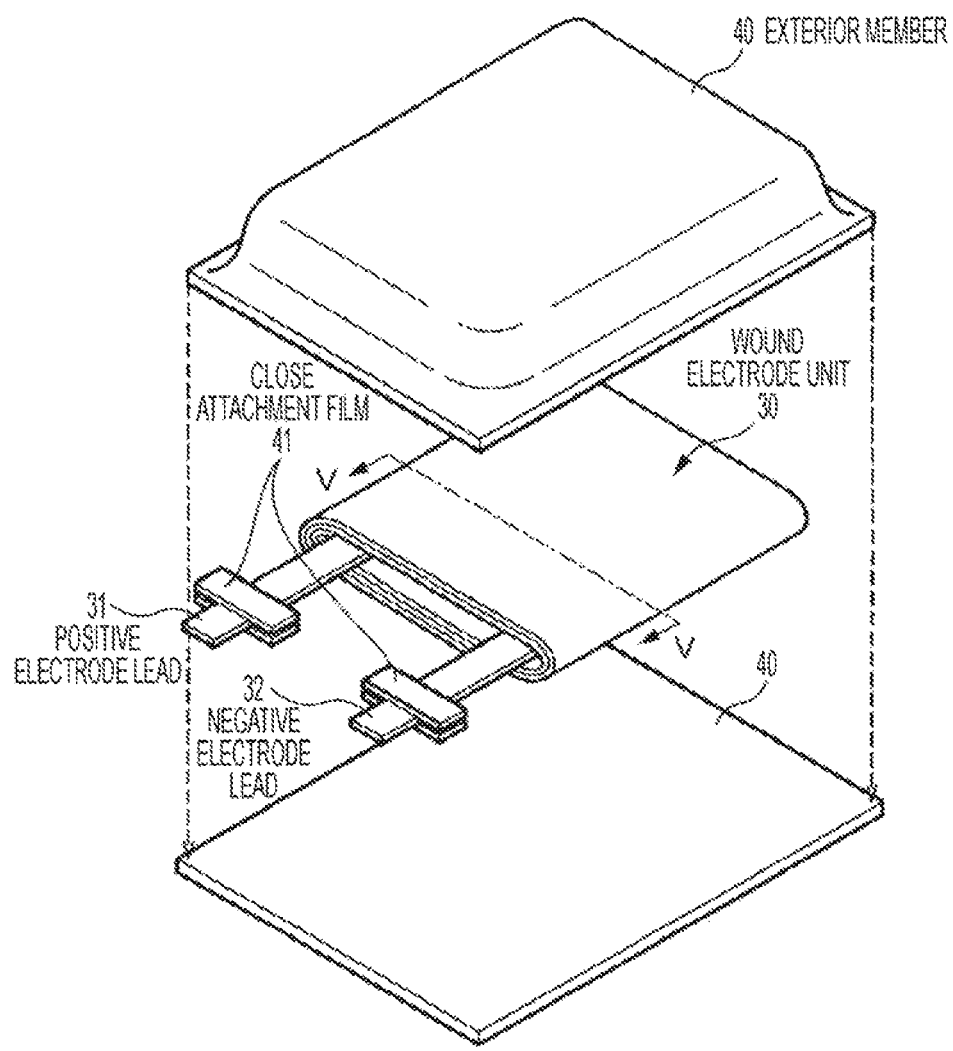
FIG. 5 is an exploded perspective view illustrating one configuration example of a non-aqueous electrolyte secondary battery according to a third embodiment of the present technology.

FIG. 5 is an exploded perspective view illustrating one configuration example of a non-aqueous electrolyte secondary battery according to a third embodiment of the present technology. This non-aqueous electrolyte secondary battery is what is called a flattened or prismatic cell, and includes a wound electrode unit 30 having a positive electrode lead 31 and a negative electrode lead 32 attached thereto, housed in an exterior member 40 in the form of a film, so that the size, weight, and thickness can be reduced.

The positive electrode lead 31 and the negative electrode lead 32 each extend from the interior to the exterior of the exterior member 40, and are drawn, for example, in a same direction. The positive electrode lead 31 and the negative electrode lead 32 are each formed of, for example, a metallic material such as aluminum, copper, nickel, or stainless steel, and are each in the form of a sheet or web.

The exterior member 40 is formed by, for example, a rectangular aluminum laminate film including a nylon film, a sheet of aluminum foil, and a polyethylene film sequentially bonded one on top of another. For example, the exterior member 40 is arranged so that the polyethylene film side faces the wound electrode unit 30, and each of peripheral regions thereof are in tight contact with each other by fusion or adhesive. Close attachment films 41 are inserted between the exterior member 40 and the positive electrode lead 31 and the negative electrode lead 32 to prevent ambient air from entering. The close attachment films 41 are formed of a material that ensures tight contact with the positive electrode lead 31 and with the negative electrode lead 32, that is, for example, a polyolefin resin such as polyethylene, polypropylene, modified polyethylene, or modified polypropylene.

Note that the exterior member 40 may be formed by, instead of the aluminum laminate film described above, a laminate film having another structure, a polymer film such as a polypropylene film, or a metal film. Alternatively, a laminate film including an aluminum core film and a polymer film disposed on one side, or on both sides, of the aluminum core film may also be used.

Figure 6:
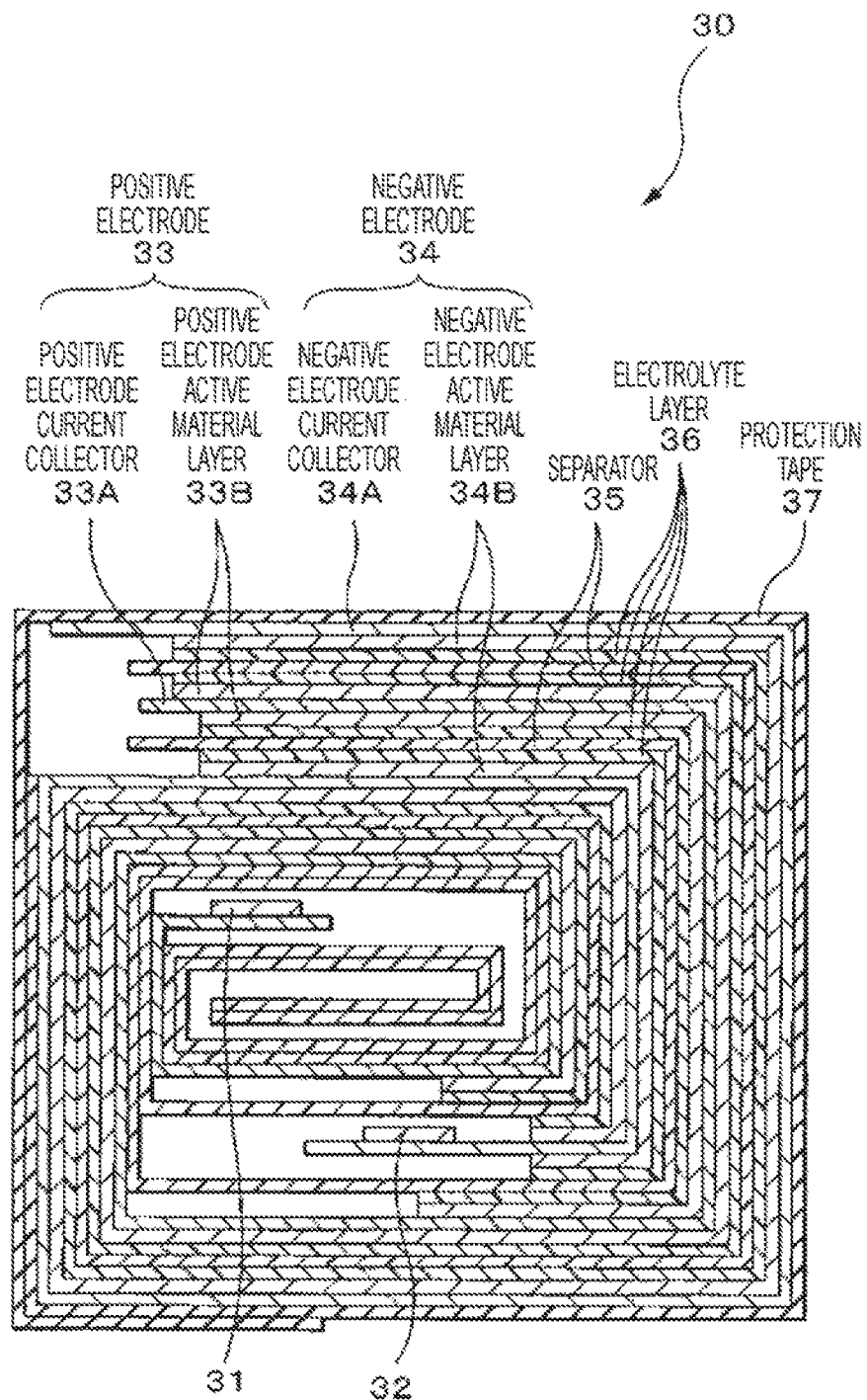
FIG. 6 is a cross-sectional view of the wound electrode unit taken along line V-V of FIG. 5.

FIG. 6 is a cross-sectional view of the wound electrode unit 30 taken along line V-V shown in FIG. 5. The wound electrode unit 30 includes a positive electrode 33 and a negative electrode 34 stacked one on top of the other and wound together, interposing a separator 35 and an electrolyte layer 36 therebetween. The outermost peripheral region is protected by a protection tape 37.

The positive electrode 33 is configured such that a positive electrode active material layer 33B is provided on one side, or on both sides, of a positive electrode current collector 33A. The negative electrode 34 is configured such that a negative electrode active material layer 34B is provided on one side, or on both sides, of a negative electrode current collector 34A, and is arranged such that the negative electrode active material layer 34B and the positive electrode active material layer 33B face each other. The positive electrode current collector 33A, the positive electrode active material layer 33B, the negative electrode current collector 34A, the negative electrode active material layer 34B, and the separator 35 are configured in a similar manner, respectively, to the positive electrode current collector 21A, the positive electrode active material layer 21B, the negative electrode current collector 22A, the negative electrode active material layer 22B, and the separator 23 in the second embodiment.

The electrolyte layer 36, in a so-called gel state, contains an electrolytic solution and a polymeric compound serving as a holder that holds this electrolytic solution. The electrolyte layer 36 in a gel state is preferred because of the possibility of providing high ion conductivity and preventing leakage of the battery. The composition of the electrolytic solution is similar to that of the secondary battery according to the second embodiment. Examples of the polymeric compound include polyacrylonitrile, polyvinylidene difluoride, a copolymer of vinylidene fluoride and hexafluoropropylene, polytetrafluoroethylene, polyhexafluoropropylene, polyethylene oxide, polypropylene oxide, polyphosphazenes, polysiloxane, polyvinyl acetate, polyvinyl alcohol, polymethyl methacrylate, polyacrylic acid, polymethacrylic acid, styrene-butadiene rubber, nitrile-butadiene rubber, polystyrene, or polycarbonate. Among others, from a viewpoint of electrochemical stability, polyacrylonitrile, polyvinylidene difluoride, polyhexafluoropropylene, or polyethylene oxide is preferred.

Note that an inorganic substance similar to the inorganic substance described in relation to the resin layer of the separator 23 in the second embodiment may also be contained in the electrolyte layer 36 in a gel state. This is because heat resistance can be further improved.

[Method for Producing Battery]

Next, one example of a method for producing the non-aqueous electrolyte secondary battery according to the third embodiment of the present technology will be described.

First, a precursor solution containing a solvent, an electrolyte salt, a polymeric compound, and a mixed solvent is applied on each of the positive electrode 33 and the negative electrode 34. The mixed solvent is then volatilized to form the electrolyte layer 36. Next, the positive electrode lead 31 is welded and attached to an end portion of the positive electrode current collector 33A, and the negative electrode lead 32 is welded and attached to an end portion of the negative electrode current collector 34A. Next, the positive electrode 33 and the negative electrode 34 each having the electrolyte layer 36 formed thereon are stacked one on top of the other, interposing the separator 35 therebetween, to form a laminate; this laminate is then wound along in a longitudinal direction; and the protection tape 37 is adhesively attached to the outermost region to form the wound electrode unit 30. Finally, for example, the wound electrode unit 30 is placed within the exterior member 40, and is enclosed therein by ensuring tight contact between peripheral regions of the exterior member 40 by means of heat fusion or other method. During this process, the close attachment films 41 are inserted between the positive electrode lead 31 and the negative electrode lead 32 and the exterior member 40. Thus, the secondary battery shown in FIGS. 5 and 6 is obtained.

In addition, this secondary battery may be produced as follows. First, the positive electrode 33 and the negative electrode 34 are produced as described above, and the positive electrode lead 31 and the negative electrode lead 32 are respectively attached to the positive electrode 33 and to the negative electrode 34. Next, the positive electrode 33 and the negative electrode 34 are stacked one on top of the other and wound together, interposing the separator 35 therebetween, and the protection tape 37 is adhesively attached to the outermost region to form the wound unit. Next, this wound unit is placed within the exterior member 40, outer peripheral regions of the unit are then heat sealed except for the portion along one side to make a sac-like form, and is stored in the exterior member 40. Next, a composition for the electrolyte, containing a solvent, an electrolyte salt, a monomer that is a raw material of the polymeric compound, a polymerization initiator, and other material(s) such as a polymerization inhibitor as needed is prepared, and is fed into the exterior member 40.

Next, after the composition for the electrolyte is fed into the exterior member 40, the opening of the exterior member 40 is heat sealed in a vacuum atmosphere to provide sealing. Next, heating is performed to polymerize the monomer to a polymeric compound to form the electrolyte layer 36 in a gel state. Thus, the secondary battery shown in FIGS. 5 and 6 is obtained.

4. Fourth Embodiment

With respect to a fourth embodiment, a battery pack and an electronic device including the non-aqueous electrolyte secondary battery according to the second or the third embodiment will be described.

Figure 7:
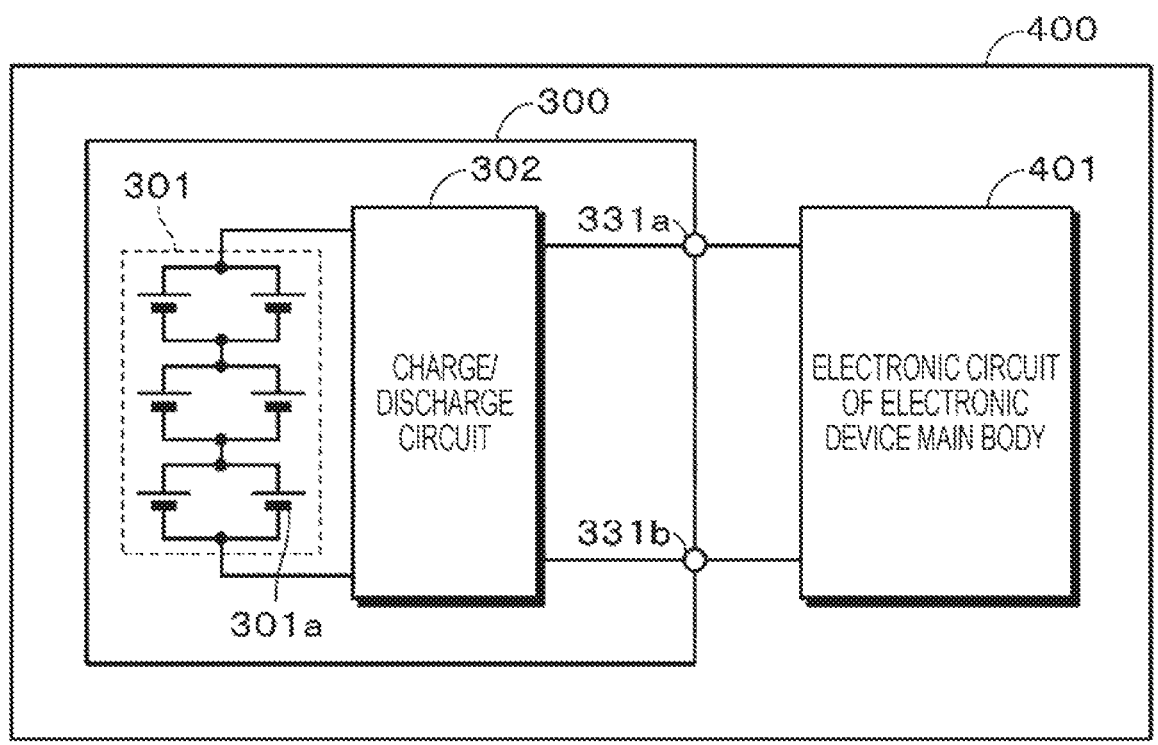
FIG. 7 is a block diagram illustrating one configuration example of a battery pack and an electronic device according to a fourth embodiment of the present technology.

Referring to FIG. 7, one configuration example of a battery pack 300 and an electronic device 400 according to a fourth embodiment of the present technology will be described below. The electronic device 400 includes an electronic circuit 401 of the electronic device main body and a battery pack 300. The battery pack 300 is electrically connected to the electronic circuit 401 via a positive electrode terminal 331a and a negative electrode terminal 331b. The electronic device 400 is configured such that, for example, the battery pack 300 is detachable by a user. Note that the configuration of the electronic device 400 is not limited thereto, and the electronic device 400 may be configured such that the battery pack 300 is incorporated in the electronic device 400, and the battery pack 300 is undetachable from the electronic device 400 by the user.

During charging of the battery pack 300, the positive electrode terminal 331a and the negative electrode terminal 331b of the battery pack 300 are respectively connected to the positive electrode terminal and to the negative electrode terminal of a charger (not shown), while during discharging of the battery pack 300 (during use of the electronic device 400), the positive electrode terminal 331a and the negative electrode terminal 331b of the battery pack 300 are respectively connected to the positive electrode terminal and to the negative electrode terminal of the electronic circuit 401.

Examples of the electronic device 400 include, but is not limited to, a notebook personal computer, a tablet computer, a cellular phone (e.g., a smartphone, etc.), a personal digital assistant (PDA), a display device (an LCD, an EL display, an electronic paper, etc.), an imaging device (e.g., a digital still camera, a digital video camera, etc.), an audio device (e.g., a portable audio player), a game console, a cordless telephone handset, an electronic book, an electronic dictionary, a radio, a headphone, a navigation system, a memory card, a pacemaker, a hearing aid, an electric power tool, an electric shaver, a refrigerator, an air conditioner, a television, a stereo, a water heater, a microwave, a dish washer, a washing machine, a drying machine, a lighting fixture, a toy, a medical device, a robot, a load conditioner, a traffic signal, and the like.

(Electronic Circuit)

The electronic circuit 401 includes, for example, a CPU, a peripheral logic unit, an interface unit, a storage unit, and the like, and controls the entire electronic device 400.

(Battery Pack)

The battery pack 300 includes an assembled battery 301 and a charge/discharge circuit 302. The assembled battery 301 is formed of multiple secondary batteries 301a connected to one another in series and/or in parallel. The multiple secondary batteries 301a are arranged, for example, in m groups connected in series, each group including n secondary batteries 301a connected in parallel (n and m are positive integers). Note that FIG. 7 illustrates an example of six secondary batteries 301a arranged in three groups connected in series, each group including two secondary batteries 301a connected in parallel (2P3S). The secondary batteries 301a used are each the non-aqueous electrolyte secondary battery according to the second or the third embodiment.

During charging, the charge/discharge circuit 302 controls the charge operation to the assembled batteries 301, while during discharging (i.e., during use of the electronic device 400), the charge/discharge circuit 302 controls the discharge operation to the electronic device 400.

5. Fifth Embodiment

With respect to a fifth embodiment, an electrical power storage (hereinafter referred to simply as "power storage") system including a power storage device having the non-aqueous electrolyte secondary battery according to the second or the third embodiment. This power storage system may be of any type as long as the power storage system uses electricity, and examples thereof include a simple electrical power unit. This electrical power system includes, for example, a smart grid, a home energy management system (HEMS), a vehicle, and the like, and is also capable of storing electrical power.

[Configuration of Power Storage System]

Figure 8:
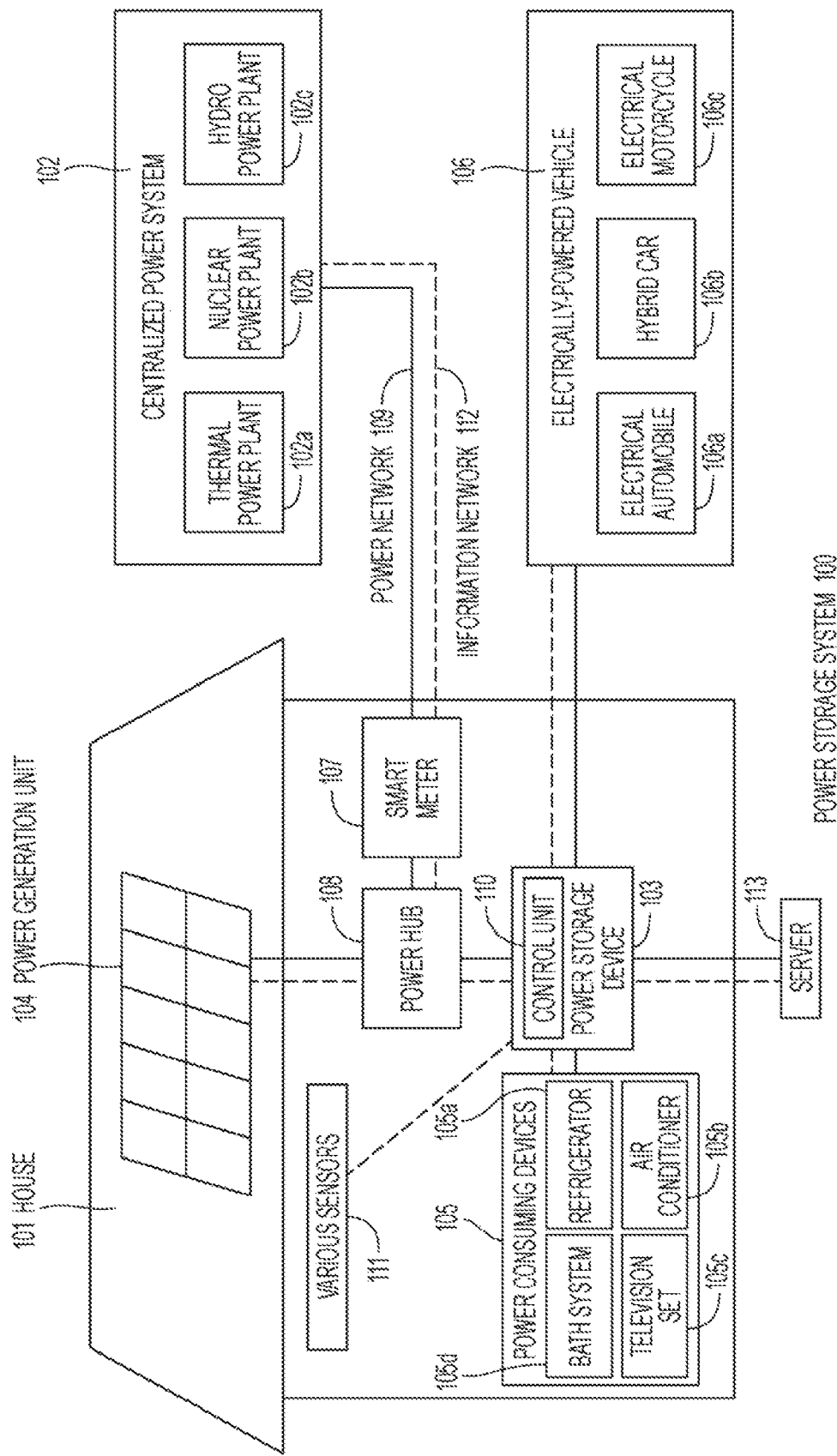
FIG. 8 is a schematic diagram illustrating one configuration example of an electrical power storage system according to a fifth embodiment of the present technology.

Referring to FIG. 8, a configuration example of a power storage system (electrical power system) 100 according to a fifth embodiment will be described below. This power storage system 100 is a residential power storage system. Electricity is supplied from a centralized power system 102, such as a thermal power plant 102a, a nuclear power plant 102b, or a hydro power plant 102c, through a power network 109, an information network 112, a smart meter 107, a power hub 108, and the like, to a power storage device 103. Along with this, electricity is supplied from an independent power source, such as a residential power generation unit 104, to the power storage device 103. The electricity supplied to the power storage device 103 is stored. The power storage device 103 is used to supply electricity for use in a house 101. Not only for the house 101, a similar power storage system may also be used for buildings.

The house 101 is provided with the residential power generation unit 104, a power consuming device 105, the power storage device 103, a control unit 110 that controls devices, the smart meter 107, the power hub 108, and various sensors 111 for obtaining various information. These devices are connected to one another by the power network 109 and the information network 112. Examples of the residential power generation unit 104 applicable include a solar battery, a fuel battery, and the like; and generated electrical power is supplied to the power consuming device 105 and/or to the power storage device 103. Examples of the power consuming device 105 include a refrigerator 105a, an air conditioner 105b, a television set 105c, a bath system 105d, and the like. In addition, the power consuming device 105 also includes an electrically-powered vehicle 106. Examples of the electrically-powered vehicle 106 include an electrical automobile 106a, a hybrid car 106b, an electrical motorcycle 106c, and the like.

The power storage device 103 includes the non-aqueous electrolyte secondary battery according to the second or the third embodiment. The smart meter 107 has functions for measuring the usage of commercial power, and for transmitting the usage measured to an electrical power company. The power network 109 may be one of, or a combination of two or more of, direct current supply, alternating current supply, and contactless supply.

The various sensors 111 include, for example, a human sensor, an illuminance sensor, an object detection sensor, a power consumption sensor, a vibration sensor, a contact sensor, a temperature sensor, an infrared sensor, and the like. Information obtained by the various sensors 111 is transmitted to the control unit 110. The information from the sensors 111 provides a weather condition, a human condition, and the like, and thus allows automatic control of the power consuming device 105, and hence, minimization of the energy consumption. In addition, the control unit 110 can transmit information about the house 101 to an external electrical power company etc. via the Internet.

The power hub 108 performs processing of power line branching, direct current to alternating current conversion, and the like. Examples of communication scheme used by the information network 112 connected to the control unit 110 include use of a communication interface, such as a universal asynchronous receiver/transceiver (UART), which is a receiver/transmitter circuit for asynchronous serial communication, and use of a sensor network compliant with a wireless communication standard such as Bluetooth®, ZigBee, or Wi-Fi. Bluetooth® method is applicable to multimedia communication, and allows one-to-many communication. ZigBee uses the physical layer of Institute of Electrical and Electronics Engineers (IEEE) 802.15.4. IEEE 802.15.4 is a name of a short-distance wireless network standard referred to as personal area network (PAN) or wireless (W)PAN.

The control unit 110 is connected to an external server 113. This server 113 may be managed by any one of the house 101, the electrical power company, and a service provider. Examples of information transmitted and received by the server 113 include power consumption information, pattern-of-living information, power charge, weather information, natural disaster information, and electricity trade information. Such information may be transmitted and received by a power consuming device (e.g., a television set) in the house, but may also be transmitted and received by a device outside the house (e.g., a mobile phone, etc.). Such information may be displayed on a device having display capability, such as a television set, a mobile phone, or a personal digital assistant (PDA).

The control unit 110 that controls the devices include a central processing unit (CPU), a random access memory (RAM), a read only memory (ROM), and the like; and is stored, in this example, in the power storage device 103. The control unit 110 is connected to the power storage device 103, the residential power generation unit 104, the power consuming device 105, the various sensors 111, and the server 113 via the information network 112, and has a function to, for example, coordinate the amount of power generation with the usage of commercial power. Note that, in addition to this, a function to trade electricity in the electricity market may be provided.

As described above, the power storage device 103 may store not only electrical power generated by the centralized power system 102, such as the thermal power plant 102*a*, the nuclear power plant 102*b*, and the hydro power plant 102*c*, but also electrical power generated by the residential power generation unit 104 (solar power plant, wind power plant). Thus, even if a variation occurs in electrical power generated by the residential power generation unit 104, the amount of electricity transmitted externally can be maintained constant or control can be provided to discharge as much as needed. For example, electricity may be consumed in a manner such that electrical power generated using solar energy is stored in the power storage device 103, and at night, cheaper midnight electricity is stored in the power storage device 103, while electricity stored in the power storage device 103 is discharged for use in a time zone in the daytime when the electricity price is higher.

Note that, in this example, the control unit 110 has been described as being included in the power storage device 103, but the control unit 110 may be included in the smart meter 107, or may be configured as an individual device. In addition, the power storage system 100 may be used for multiple households in a multi-family flat, or may be used for multiple single-family houses.

6. Sixth Embodiment

With respect to a sixth embodiment, an electrically-powered vehicle including the non-aqueous electrolyte secondary battery according to the second or the third embodiment will be described.

Figure 9:
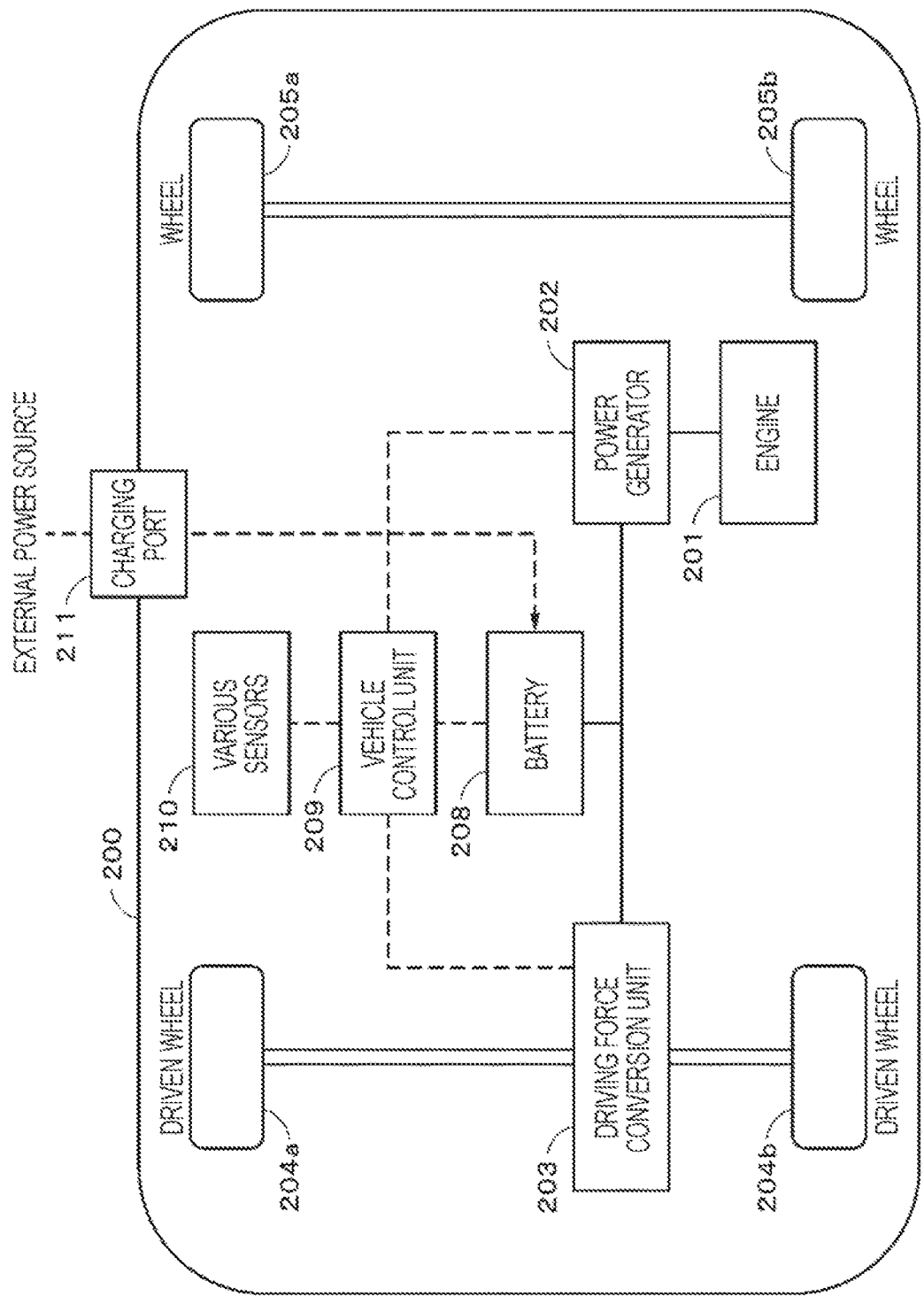
FIG. 9 is a schematic diagram illustrating one configuration of an electrically-powered vehicle according to a sixth embodiment of the present technology.

Referring to FIG. 9, one configuration of an electrically-powered vehicle according to a sixth embodiment of the present technology will be described. This hybrid vehicle 200 is a hybrid vehicle that employs a series hybrid system. A series hybrid system is a vehicle that uses electrical power generated by a power generator driven by an engine, or such electrical power once stored in a battery, to run by means of an electrical power-to-driving force conversion unit 203.

This hybrid vehicle 200 is provided with an engine 201, a power generator 202, the electrical power-to-driving force conversion unit 203, a driven wheel 204*a*, a driven wheel 204*b*, a wheel 205*a*, a wheel 205*b*, a battery 208, a vehicle control unit 209, various sensors 210, and a charging port 211. The battery 208 used is the non-aqueous electrolyte secondary battery according to the second or the third embodiment.

The hybrid vehicle 200 runs by using the electrical power-to-driving force conversion unit 203 as the power source. One example of the electrical power-to-driving force conversion unit 203 is a motor. The electrical power-to-driving force conversion unit 203 operates by electrical power from the battery 208, and rotative force of this electrical power-to-driving force conversion unit 203 is transmitted to the driven wheels 204*a* and 204*b*. Note that the electrical power-to-driving force conversion unit 203 is applicable as either an alternating current motor or a direct current motor by using direct current to alternating current (DC-AC) conversion or reverse conversion thereof (AC-DC conversion) at a necessary point. The various sensors 210 are used to control the rotational frequency of the engine via the vehicle control unit 209, and/or to control the position of a throttle valve (throttle position), which is not shown. The various sensors 210 include a speed sensor, an acceleration sensor, an engine rotational frequency sensor, and the like.

The rotative force of the engine 201 is transmitted to the power generator 202, and this rotative force causes the power generator 202 to generate electricity, which can be stored in the battery 208.

When the hybrid vehicle 200 is decelerated by a braking mechanism (not shown), resisting force relating to the deceleration is applied to the electrical power-to-driving force conversion unit 203 as rotative force, and this rotative force causes the electrical power-to-driving force conversion unit 203 to generate regeneration electricity, which is stored in the battery 208.

By connection of the battery 208 to a power supply external to the hybrid vehicle 200 through the charging port 211, the battery 208 can also be supplied with electricity from the external power supply through the charging port 211 as an input terminal, and can store the supplied electricity.

Although not shown, an information processing device may be provided that performs information processing in relation to vehicle control on the basis of information about the non-aqueous electrolyte secondary battery. Examples of such information processing device include an information processing device that indicates remaining battery capacity on the basis of information relating to the remaining capacity of the non-aqueous electrolyte secondary battery.

Note that the foregoing description has been directed to a series hybrid car as an example, which uses electrical power generated by a power generator driven by an engine, or such electrical power once stored in a battery, to run using a motor. However, the present technology is also effectively applicable to a parallel hybrid car, which uses both outputs of an engine and of a motor as a drive source, and uses three different modes by switching as appropriate: driving only using the engine, driving only using the motor, and driving using both the engine and the motor. Moreover, the present technology is also effectively applicable to a so-called electrically-powered vehicle, which uses no engine, and is thus driven and runs only using a drive motor.

EXAMPLES

The present technology will be specifically described below using examples. However, the present technology is not limited to only these examples.

In the examples, the following instruments were used for X-ray photoelectron spectroscopy (XPS), X-ray diffraction (XRD), and Raman spectroscopy.

(XPS)
Instrument: JEOL JPS9010
Measurement: Wide scan, narrow scan (Si 2p, C 1s, O 1s, Li 1s).

All peaks were corrected using 248.6 eV of C 1s, and bonding states were analyzed by removing background and performing peak fitting.

(XRD)
Instrument: Bruker D8 Advance
Measurement: 2θ-θ scan
(Raman Spectroscopy)
Instrument: Nanofinder, Tokyo Instruments, Inc.
Measurement: Raman spectra The examples will be described in the order set forth below:
i Li-pre-doped negative electrode (Reference Examples)
ii Heat treated, Li-pre-doped negative electrode
iii Heat treated, Li-pre-doped $SiO_x$ powder material
iv Heat treated, Li-pre-doped $SiO_x$ powder material (example of another Li pre-doping technique)

REFERENCE EXAMPLES

[i Evaluation of Li-Pre-Doped Negative Electrode]
<Sample 1>
(Production of Negative Electrode)

First, a $SiO_x$ powder material having the surface thereof coated with carbon was prepared. Next, this $SiO_x$ powder material, a poly(amic acid) solution (a precursor of polyimide) (product of Ube Industries, Ltd., trade name: U-Varnish-A), KS 6 (carbon powder, product of TIMCAL), and DB (DENKA BLACK, product of Denka Company Ltd.) were weighed out at a mass ratio of 7:0.75:1:0.25, and were dispersed into an appropriate amount of N-methyl-2-pyrrolidone (NMP) to form a negative electrode mixture slurry.

Next, the negative electrode mixture slurry prepared was applied on copper foil (negative electrode current collector), followed by drying at 425° C. in a vacuum firing furnace to form a negative electrode active material layer on the copper foil. Thus, a negative electrode was obtained. Next, this negative electrode was punched to punch out a disk of 15 mm diameter, and this disk was then compressed by a press machine. Thus, an intended negative electrode (referred to as "$SiO_x$ negative electrode") was obtained.

(Production of Counterelectrode Li Coin Cell)

A coin type half cell having this negative electrode containing a Si-containing material as the working electrode, and Li metal foil as the counterelectrode, and having a size of 2016 (size of 20 mm in diameter, and of 1.6 mm in height) (hereinafter referred to as "counterelectrode Li coin cell") was produced as follows.

A disk of 15 mm diameter of Li metal foil was prepared as the counterelectrode by being punched out. Next, a microporous film made of polyethylene was prepared as the separator. Next, a solvent was prepared by mixing together ethylene carbonate (EC), fluoroethylene carbonate (FEC), and dimethyl carbonate (DMC) at a mass ratio of 40:10:50, and $LiPF_6$ (product of Tomiyama Pure Chemical Industries, Ltd.) was then dissolved in this solvent as an electrolyte salt at a concentration of 1 mol/kg to prepare a non-aqueous electrolytic solution.

Next, the positive electrode and the negative electrode produced were stacked one on top of the other, interposing the microporous film therebetween to form a laminate. Together with this laminate, the non-aqueous electrolytic solution was enclosed in an external cup and in an external case, and a gasket was then used to provide sealing. Thus, an intended counterelectrode Li coin cell was obtained.

<Sample 2>
A negative electrode that was Li-pre-doped using an organic Li-doping method was produced as follows. A Li coin battery cell was produced in a similar manner to that of Sample 1 except for the foregoing condition.

(Lithium Naphthalenide Immersion Method (Organic Li-Doping Method))

Fifty cubic centimeter (cc) of N-butyl methyl ether and 1.6 g of naphthalene were mixed together and stirred to dissolve naphthalene, and a colorless and transparent solution was thus prepared. To this solution, 0.1 g of Li foil having a thickness of 0.8 mm was mixed, and the resultant mixture was stirred for five hours using a stirrer to synthesize a lithium naphthalenide solution. Thereafter, the $SiO_x$ negative electrode was placed in the solution, and the mixture was allowed to react for 24 hours. Note that the foregoing operation was performed in an argon-filled glovebox. After the reaction, the Li-doped $SiO_x$ negative electrode was taken out, and was then filtered and DMC washed in a dry room, followed by vacuum drying at 80° C. Thus, an intended negative electrode was obtained.

(Evaluation)
(Charge/Discharge Test)

A charge/discharge test was performed on the produced counterelectrode Li coin cell under the following conditions to identify the charge/discharge characteristics (charge and discharge curves) for the first charge/discharge cycle of the counterelectrode Li coin cell.

First Charge/Discharge Cycle
Charge: 0 V Constant current/Constant voltage (CCCV) 0.2 mA/cm² 0.04 mA cut-off
Discharge: Constant current (CC) 1.5 V 0.2 mA/cm²

Note that an initial efficiency is calculated by the equation below:

Initial efficiency (%)=(initial discharge capacity/initial charge capacity)×100

(Result)

Figure 10:
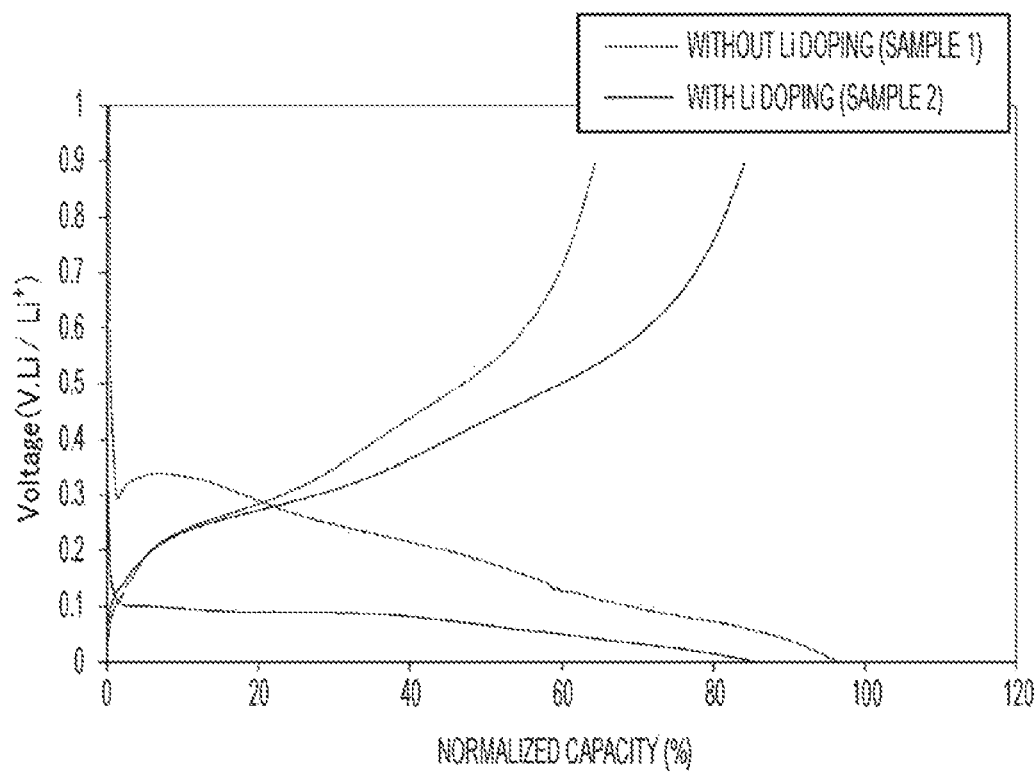
FIG. 10 is a graph showing charge and discharge curves for Samples 1 and 2.

FIG. 10 illustrates charge and discharge curves (normalized to the initial charge capacity (=100%)) of the $SiO_x$ electrodes of Sample 1 and of Sample 2. Comparison between the charge and discharge curves of Sample 1 and of Sample 2 showed that Li pre-doping increased the initial efficiency from 64% to 81%.

The Sample 2 (Li-pre-doped) exhibited a plateau potential of from 0.06 to 0.1 V during the first charge. This is comparable to the plateau potential during the first charge of the Si electrode. In contrast, Sample 1 exhibited a plateau potential of from 0.2 to 0.3 V during the first charge. Note that, although not shown in FIG. 10, the plateau potential during charging in the second or later cycles stabilizes in a range of from 0.2 to 0.3 V regardless of whether Li pre-doping has been performed or not.

The test results show that only the first charge curve of Sample 2 (Li-pre-doped) exhibits an unusual plateau potential. Note that not only Li pre-doping using the organic Li-doping method, but also Li pre-doping using an electrochemical doping showed a similar tendency. The plateau potential of from 0.06 to 0.1 V during the first charge lies in a Si—Li ($Li_{12}Si_3$ to $Li_{15}Si_4$) formation range, meaning that Si—Li bonding reaction has already been initiated since an early stage of charging. The shift of plateau to 0.3 V in the second charge means that the Si—Li bond is cleaved by discharge, leaving almost no Si—Li bonds. Thus, it has been verified that not only the Si—O—Li bond, but also the Si—Li bond is formed during Li pre-doping.

[ii Evaluation of Heat Treated, Li-Pre-Doped Negative Electrode]

Example 1-1

The following heat treatment was performed on a Li-pre-doped negative electrode using a similar technique to that of Sample 2, and thus an intended negative electrode was obtained. Using this negative electrode, a Li coin battery cell was produced in a similar manner to that of Sample 2.

(Heat Treatment Step)

The Li-pre-doped negative electrode was heat treated at a predetermined temperature (400° C.) for one hour using an Ar atmosphere furnace. After the heat treatment, by-products (lithium carbonate, lithium hydroxide, organic products) on the surface were removed by water washing and DMC washing. Thus, an intended negative electrode was obtained.

Comparative Example 1-1

In the heat treatment step, the temperature used for the heat treatment was 200° C. A counterelectrode Li coin cell was produced in a similar manner to that of Example 1-1 except for the foregoing condition.

Comparative Example 1-2

In the heat treatment step, the temperature used for the heat treatment was 300° C. A counterelectrode Li coin cell was produced in a similar manner to that of Example 1-1 except for the foregoing condition.

(Evaluation)
(Charge/Discharge Test)

A charge/discharge test was performed on each of the counterelectrode Li coin cells of Sample 2, Example 1-1, and Comparative Examples 1-1 and 1-2 under the following conditions to identify the charge/discharge characteristics (charge and discharge curves) for the first charge/discharge cycle of the counterelectrode Li coin cells.

First Charge/Discharge Cycle
Charge: 0 V Constant current/Constant voltage (CCCV) 0.2 mA/cm² 0.04 mA cut-off
Discharge: Constant current (CC) 1.5 V 0.2 mA/cm²
In addition, OCV (0.9 V cut-off) before the first charge was identified.

(Result)

Figure 11:
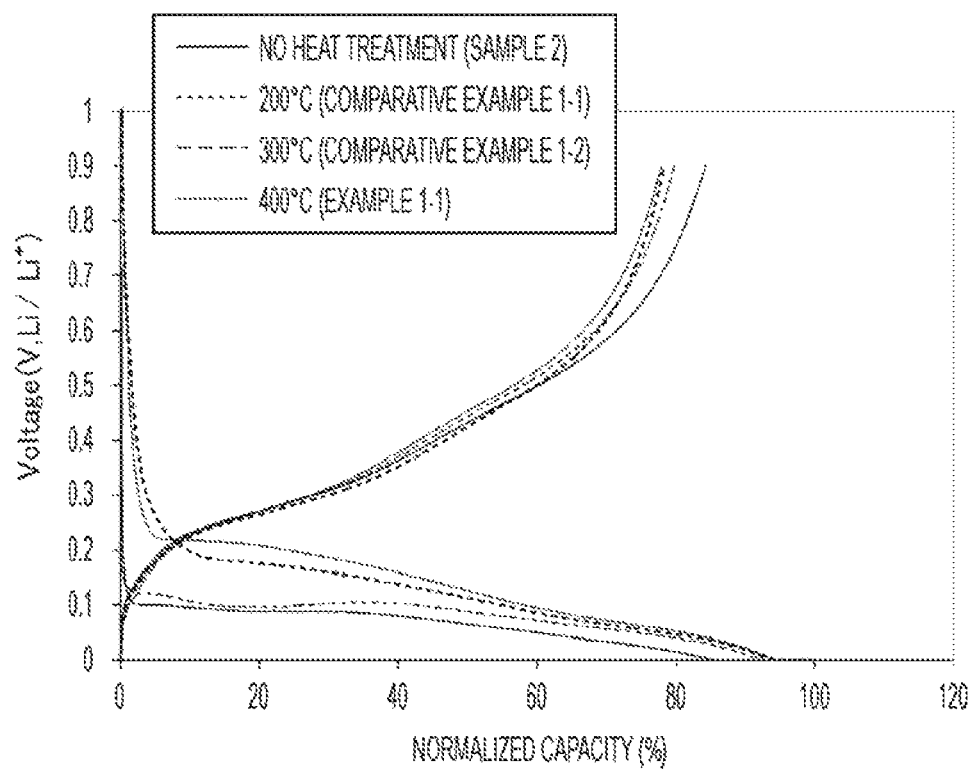
FIG. 11 is a graph showing charge and discharge curves for Sample 2, Example 1-1, and Comparative Examples 1-1 to 1-2.

FIG. 11 illustrates charge and discharge curves for Sample 2, Example 1-1, and Comparative Examples 1-1 and 1-2. Table 1 shows the values of OCV (0.9 V cut-off) before charging and the initial efficiency for Samples 1 and 2, Example 1-1, and Comparative Examples 1-1 and 1-2.

TABLE 1

|  | Li Pre-doping | Heat Treatment Temperature [° C.] | OCV [V] | Initial Efficiency [%] |
|---|---|---|---|---|
| Sample 1 | No | No heat treatment | 3.16 | 68.2 |
| Sample 2 | Yes | No heat treatment | 0.71 | 88 |
| Comparative Example 1-1 | Yes | 200 | 0.36 | 83.5 |
| Comparative Example 1-2 | Yes | 300 | 1.61 | 80.4 |
| Example 1-1 | Yes | 400 | 1.62 | 81.7 |

Example 1-1 and Comparative Example 1-1 on which heat treatment was performed at 300° C. or above each exhibited a change in the plateau potential during the first charge to 0.2 to 0.3 V, and also exhibited a significant increase in the OCV. Meanwhile, the initial efficiency is maintained at 80% or higher. These results suggest that heat treatment at 300° C. has significantly changed a chemical potential of Li-pre-doped $SiO_x$.

(Evaluation of Cycle Characteristic)
(Charge/Discharge Test)

A charge/discharge test was performed under the following conditions to identify the cycle characteristics of the counterelectrode Li coin cells of Sample 2 and of Example 1-1.

(Charge/Discharge Test)
Charge: 0 V Constant current/Constant voltage (CCCV) 0.2 mA/cm² 0.04 mA cut-off
Discharge: Constant current (CC) 1.5 V 0.2 mA/cm²
Second and Later Charge/Discharge Cycles
Charge: 0 V CCCV 1.0 mA/cm2 0.04 mA cut-off
Discharge: CC 1.5 V 1.0 mA/cm2
Number of charge/discharge cycles: 30

Capacity retention (%)=(discharge capacity in each cycle/initial discharge capacity)×100(%)

(Result)

Figure 12:
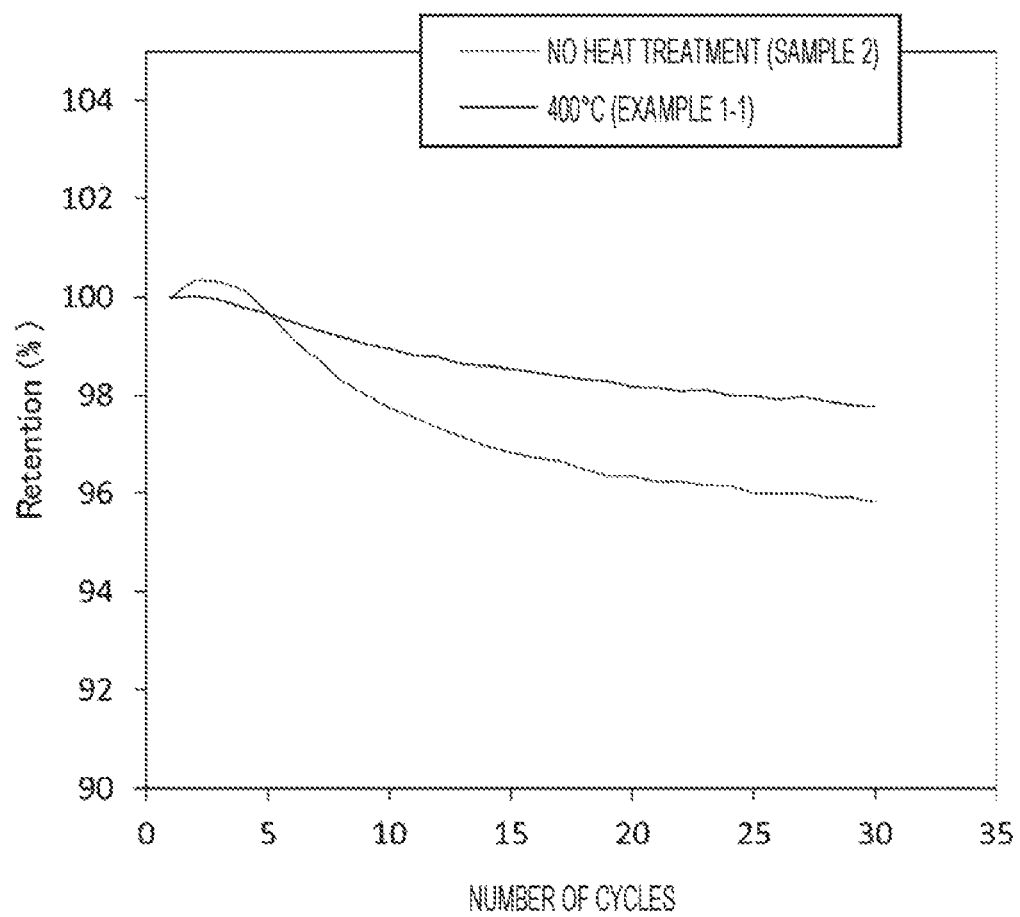
FIG. 12 is a graph plotting the capacity retention against the number of cycles.

FIG. 12 illustrates a graph plotting the capacity retention against the number of cycles for each of Sample 2 and Example 1-1. In Example 1-1, an improvement in cycle characteristic was confirmed. The fact that a major improvement in the capacity retention is observed in early cycles (during first 20 cycles) suggests that lithium stabilization resulting from heat treatment acts effectively.

[iii Evaluation of Heat Treated, Li-Pre-Doped $SiO_x$ Powder Material]

A non-heat treated, Li-pre-doped $SiO_x$ powder material is known to have drawbacks, such as severe reaction with water, thus generating hydrogen (bubbles); further reaction with a binder such as polyimide or PVDF, resulting in solidification during formation of a negative electrode mixture slurry, thereby hindering application thereof on copper foil; etc.

Meanwhile, Li stabilization by the heat treatment described above, performed on a Li-pre-doped $SiO_x$ powder material, enables easy handling in air as a usual active material, and is thus preferred. Evaluation of heat treated, Li-pre-doped $SiO_x$ powder materials will be described below.

Example 2-1

A $SiO_x$ powder material that was Li-pre-doped using an organic Li-doping method similar to that described in Sample 2 was obtained. That is, a $SiO_x$ powder material was fed into a lithium naphthalenide solution, and the mixture was allowed to react for 24 hours. Then, filtration and DMC washing were carried out, followed by vacuum drying at 80° C. Thus, a Li-pre-doped $SiO_x$ powder material was obtained. Note that, in the foregoing step, the Li doping level was adjusted to 15 at %.

Next, the Li-pre-doped $SiO_x$ powder material was placed in an infrared vacuum furnace, and heat treated at 400° C. for one hour. Thus, an intended heat treated, Li-pre-doped $SiO_x$ powder material was obtained.

Example 2-2

A heat treated, Li-pre-doped $SiO_x$ powder material was obtained in a similar manner to that of Example 2-1 except that the temperature used for the heat treatment was 500° C.

Comparative Example 2-1

A $SiO_x$ powder material similar to Sample 1 was used as Comparative Example 2-1.

Comparative Example 2-2

A Li-pre-doped $SiO_x$ powder material (before heat treatment) similar to Example 2-1 was used as Comparative Example 2-2.

Comparative Examples 2-2 to 2-5

The temperature used for the heat treatment was 100° C. (Comparative Example 2-3), 200° C. (Comparative Example 2-4), 300° C. (Comparative Example 2-5), or 600° C. (Comparative Example 2-6). Heat treated, Li-pre-doped $SiO_x$ powder materials were obtained in a similar manner to that of Example 2-1 except for the foregoing conditions.

(Evaluation)

(XPS)

The powder materials obtained as described above were evaluated using XPS.

(Result)

Figure 13:
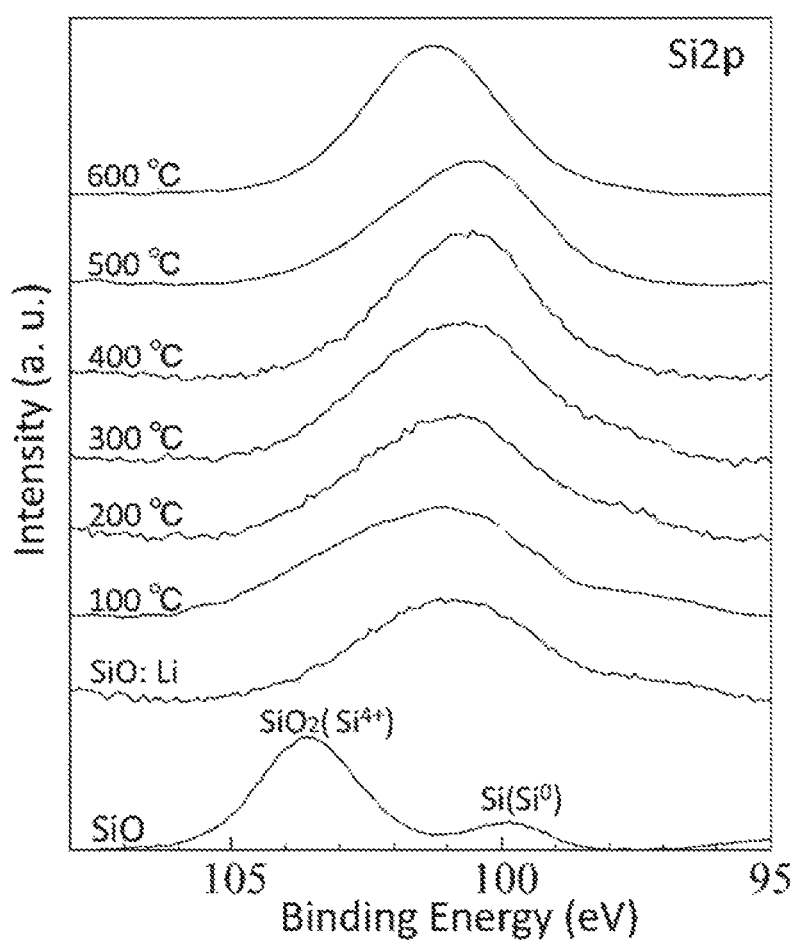
FIG. 13 illustrates XPS spectra of Si 2p for Examples 2-1 to 2-2 and Comparative Examples 2-1 to 2-5.
Figure 14:
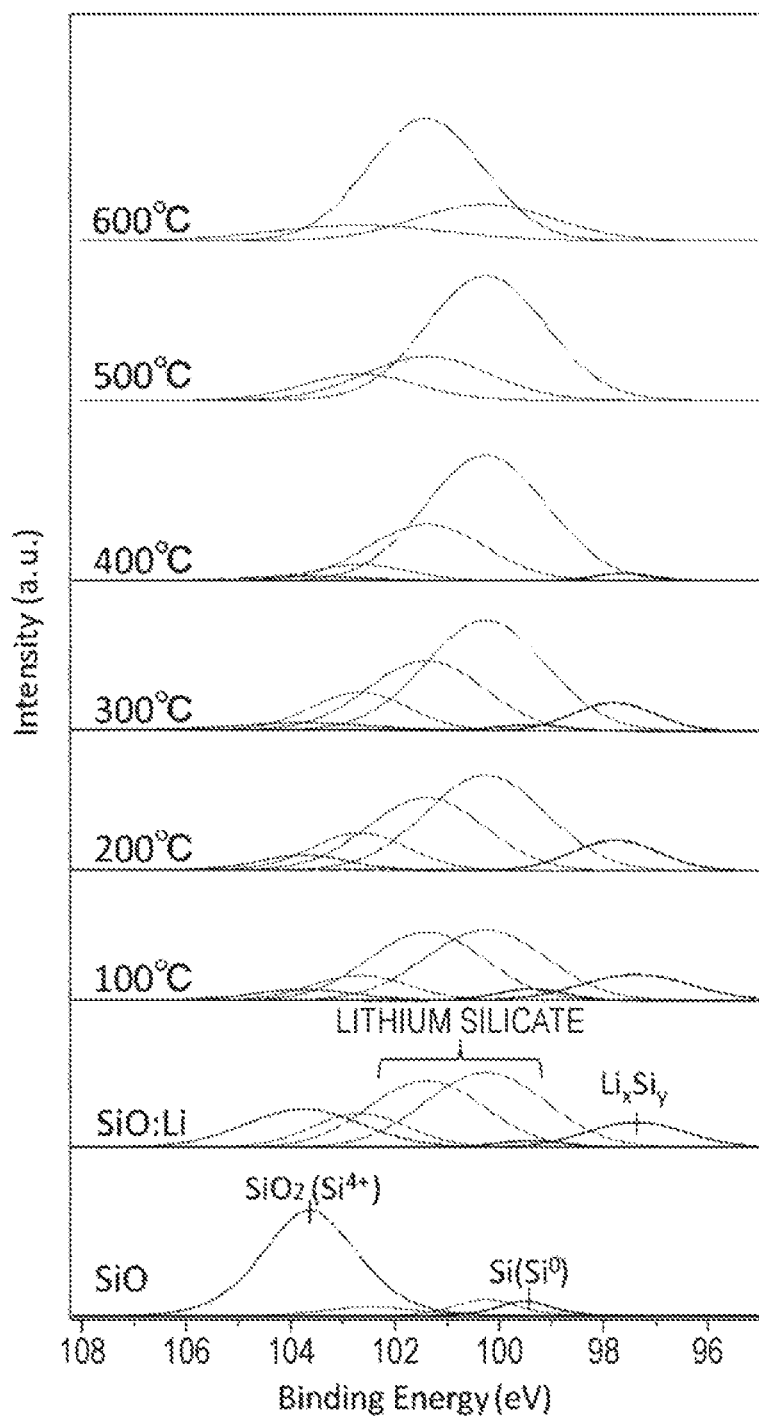
FIG. 14 illustrates fitting curves of the Si 2p spectra of FIG. 13.
Figure 15:
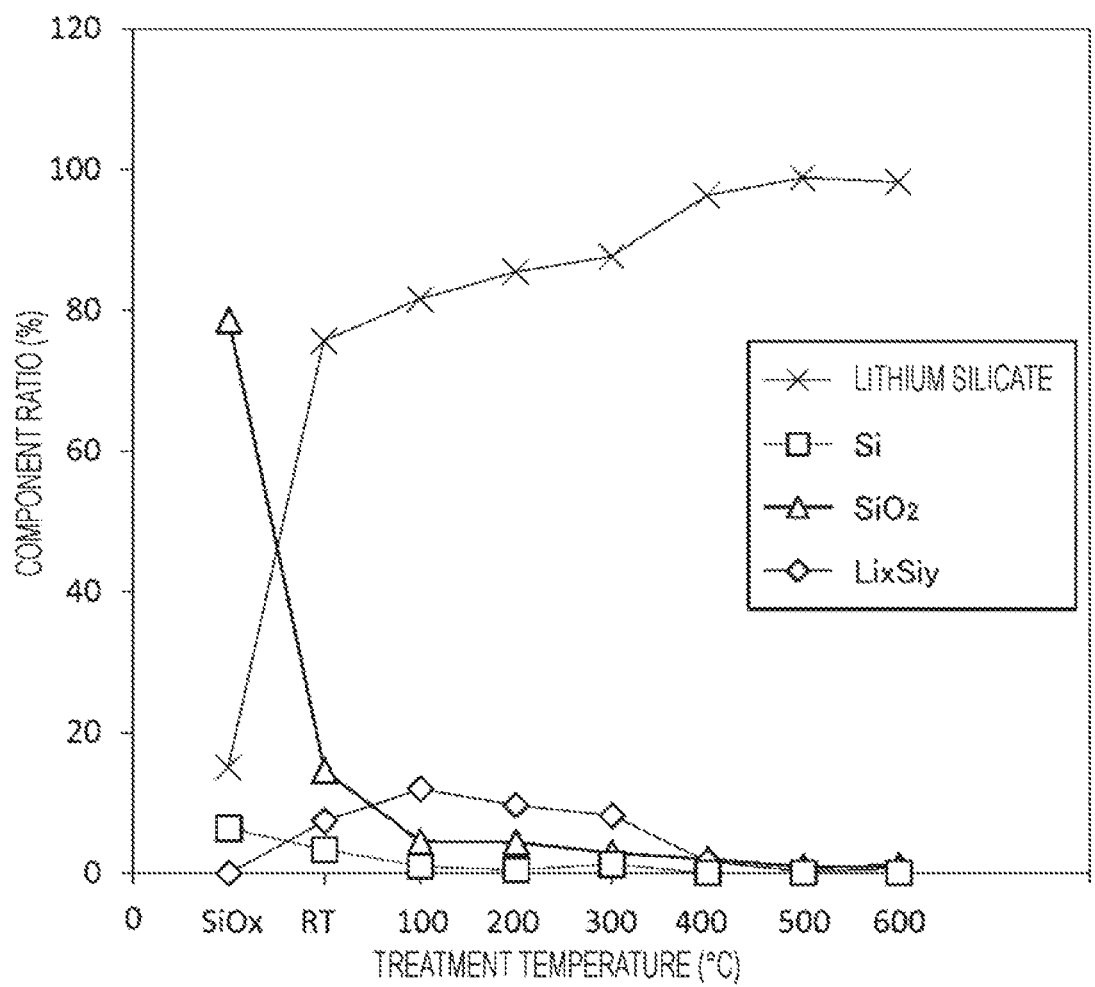
FIG. 15 is a graph illustrating component ratios determined by XPS.

FIG. 13 illustrates Si 2p spectra of the powder materials. FIG. 14 illustrates fitting curves for the Si 2p spectra of the powder materials. Table 2 shows the bonding state of Li, Si, and O seen from the XPS spectra. Table 3 and FIG. 15 show component ratios obtained from XPS.

TABLE 2

| Peak Location [eV] | Bonding State | Expected State | Li Conductivity | Electrical Conductivity | Li Leakage |
|---|---|---|---|---|---|
| 97.4 | Li—Si metallic bond | $Li_xSi_y$ | High | High | High |
| 99.4 | Si—Si sp3 bond | Si | High | Medium | — |
| 100.3 | Si—O—Li low ionic | $Li_4SiO_4$ | Medium | Low | Low |
| 101.5 | Si—O—Li moderately ionic | $Li_2Si_2O_5$ | Medium | Low | Low |
| 102.7 | Si—O—Li highly ionic | $Li_2SiO_3$ | Low | Low | Low |
| 103.8 | O—Si—O | $SiO_2$ | Very Low | Very Low | — |

TABLE 3

| | Li Pre-doping | Heat Treatment Temperature [° C.] | $Li_xSi_y$ [%] | Si [%] | $Li_4SiO_4$ [%] | $Li_2Si_2O_5$ [%] | $Li_2SiO_3$ [%] | $SiO_2$ [%] | Sum of Silicate [%] |
|---|---|---|---|---|---|---|---|---|---|
| Comparative Example 2-1 | No | No heat treatment | — | 6.4 | 8.5 | 0 | 6.5 | 78.6 | 15 |
| Comparative Example 2-2 | Yes | No heat treatment | 7.4 | 3.4 | 33.5 | 31.9 | 10.2 | 14.6 | 75.6 |
| Comparative Example 2-3 | Yes | 100 | 12 | 1 | 36.2 | 33.7 | 11.6 | 4.5 | 81.5 |
| Comparative Example 2-4 | Yes | 200 | 9.7 | 0.5 | 42.1 | 30.5 | 12.8 | 4.4 | 85.4 |
| Comparative Example 2-5 | Yes | 300 | 8.2 | 1.3 | 46.9 | 28.1 | 12.6 | 2.9 | 87.6 |
| Example 2-1 | Yes | 400 | 1.7 | 0 | 62.5 | 27 | 6.8 | 2 | 96.3 |
| Example 2-2 | Yes | 500 | 0.3 | 0 | 67.1 | 22.2 | 9.5 | 0.9 | 98.8 |
| Comparative Example 2-6 | Yes | 600 | 0.7 | 0 | 20.9 | 72.6 | 4.7 | 1.1 | 98.2 |

In the Si 2p spectra shown in FIG. 13, the peaks shifted toward lower energy levels up to Example 2-2 that had been heat treated at 500° C., and Comparative Example 2-6 that had been heat treated at 600° C. showed a change in peak shift direction toward higher energy levels.

The results of peak separation of these Si 2p spectra obtained by fitting (FIG. 14) have confirmed the following. That is, it has been confirmed that the spectra of Comparative Example 2-2 indicated by "SiO:Li" shows a significantly reduced $SiO_2$ ($Si^{4+}$) peak (103.8 eV) and an increased lithium silicate peak (100.3 eV and 101.5 eV) as compared to that before Li pre-doping (Comparative Example 2-1).

These results have shown that, after Li pre-doping, lithium has coordinated with the $SiO_4$ tetrahedron ($SiO_2$ component) of $SiO_x$ to form a Si—O—Li bond. A $Li_xSi_y$ peak (97.4 eV) was also observed, which shows that a Li—Si bond has been formed during Li pre-doping. These are believed to be causes of the unusual plateau potentials during the first charge due to Li pre-doping, as described in relation to the results of Reference Examples described above, and are believed to be causes of Li elution.

With an increase in processing temperature, Comparative Example 2-5 that had been heat treated at 300° C. showed merely a weak $SiO_2$ peak, and Example 2-1 that had been heat treated at 400° C. showed almost no $Li_xSi_y$ peak. In addition, with the disappearance of $Li_xSi_y$ peak, the peak of lithium silicate has increased. These facts confirm that heat treatment converts a Li—Si bond into a Si—O—Li bond. Note that the changes in the plateau potential and in the OCV in the first charge of those heat treated at 300° C. or above as described in relation to Example 2-1 suggest that this conversion from a Li—Si bond to a Si—O—Li bond has occurred.

In Example 2-2 that has been heat treated at 500° C., it is believed that, because of the peak at 100.3 eV being the primary component, a structure similar to $Li_4SiO_4$ (100.3 eV) is formed as the potential state. In view of $SiO_x$ before Li pre-doping having a complicated, phase-separated amorphous structure as shown in FIG. 1, it can be inferred that the material has an amorphous structure in which lithium coordinates with the oxygen site in a $SiO_4$ tetrahedron, rather than the structure of pure $Li_4SiO_4$.

Meanwhile, in Comparative Example 2-5 that has been heat treated at 600° C., it is believed that, because of the peak at 101.5 eV being the primary component, a structure similar to $Li_2Si_2O_5$ (101.5 eV) is formed as the potential state. Note that heat treatment at a higher temperature (e.g., 800° C.) causes a change to a structure similar to $Li_2SiO_3$ (102.7 eV), which is similar to $SiO_2$.

As shown in Table 3, heat treatment at 400° C. forms silicates with a total content of 96% or more, and it has been found that treatment at 400° C. or above (one hour), or prolonged treatment (2 to 24 hours) at about 300° C., is preferred for Li stabilization.

(Evaluation)
(XRD)

The powder materials obtained as described above were evaluated using XRD.

(Result)

Figure 16:
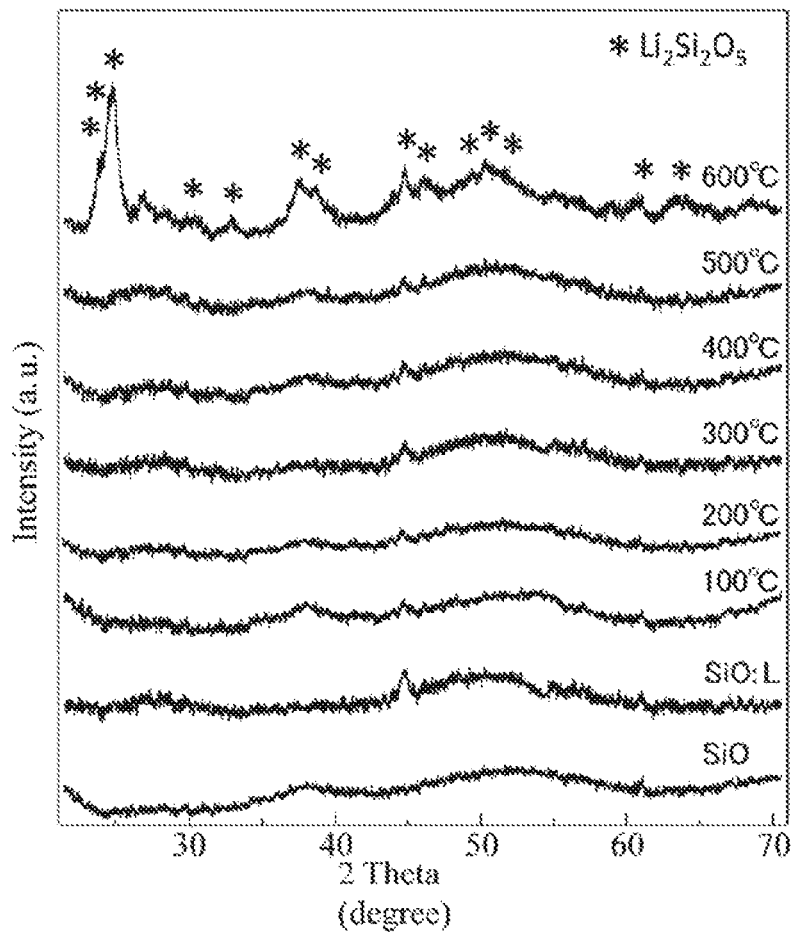
FIG. 16 illustrates XRD patterns for Examples 2-1 to 2-2 and Comparative Examples 2-1 to 2-5.

FIG. 16 illustrates XRD patterns of the powder materials. The XRD patterns show that heat treatment at temperatures from 100° C. to 500° C. caused no change from the amorphous state, while heat treatment at 600° C. (Comparative Example 2-6) caused a $Li_2Si_2O_5$ crystalline pattern to be observed. These results suggest that a temperature below 600° C. is useful for forming a Si—O—Li bond due to Li re-diffusion heat treatment. Heat treatment at 600° C. causes crystallization, and thus significantly changes the internal structure to form a different substance from Li-pre-doped SiOx.

(Evaluation of Electrode Production)

Powder materials produced (Examples 2-1 to 2-2 and Comparative Examples 2-2 to 2-5) were used to prepare negative electrode mixture slurries (referred to as "mixture formation") in a similar manner to that of Sample 1, and these mixture slurries were each applied on copper foil to produce an electrode. In addition, electrodes were produced in a similar manner using an aqueous binder as the binder. During this production step, "hydrogen generation during water washing" and "state check of binder (check of whether solidified or not)" were performed.

(Result)

Evaluation results are shown in Table 4.

TABLE 4

| | Li Pre-doping | Heat Treatment Temperature [° C.] | Hydrogen (Bubble) Generation after Immersion | Solidification of Polyimide Binder | Solidification of Aqueous Binder |
|---|---|---|---|---|---|
| Comparative Example 2-2 | Yes | No heat treatment | Yes | Yes | Yes |
| Comparative Example 2-3 | Yes | 100 | Yes | Yes | Yes |
| Comparative Example 2-4 | Yes | 200 | Yes | Yes | Yes |
| Comparative Example 2-5 | Yes | 300 | Yes | Yes | Yes |
| Example 2-1 | Yes | 400 | No | No | No |
| Example 2-2 | Yes | 500 | No | No | No |

In Comparative Example 2, and in Comparative Examples 2-3 to 2-5 that had been heat treated at temperatures from 100° C. to 300° C., bubbles were generated during water washing, and the binder solidification occurred, and accordingly, mixture formation failed. In contrast, in Examples 2-1 to 2-2 that had been heat treated at temperatures from 400° C. to 500° C., no bubbles were generated during water washing, and mixture formation was possible. These results are exactly as suggested by the XPS results. That is, this may be because heat treatment at 400° C. or above eliminated $Li_xSi_y$, and thus prevented Li elution.

Example 3-1

Figure 17:
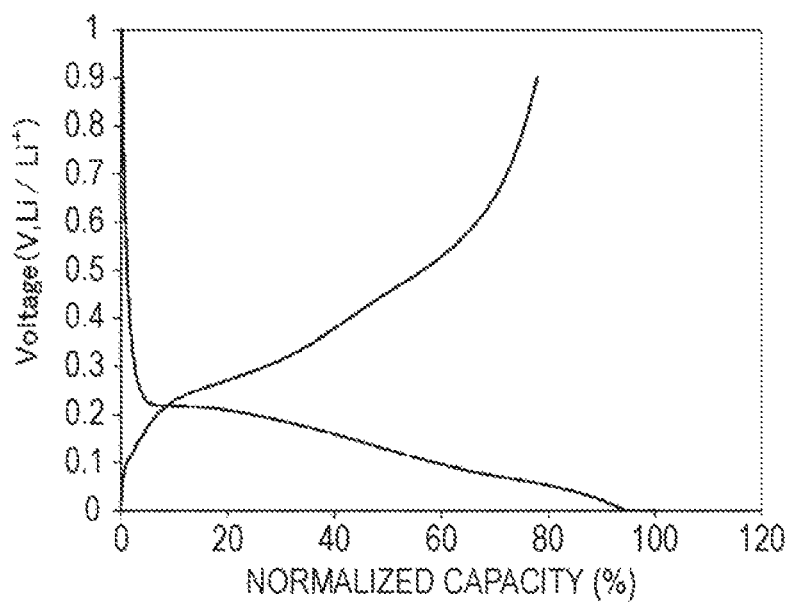
FIG. 17 is a graph showing charge and discharge curves for Example 3-1.

A negative electrode containing a Li-pre-doped $SiO_x$ powder material that had been heat treated at 400° C. (Example 2-1) was produced. Next, a counterelectrode Li coin cell was produced with this negative electrode as the working electrode, in a similar manner to that of Sample 1.
(Evaluation)
(Charge/Discharge Test)
A charge/discharge test was performed on the produced counterelectrode Li coin cell under the following conditions to identify the charge/discharge characteristics (charge and discharge curves and initial efficiency) for the first charge/discharge cycle of the counterelectrode Li coin cell.
(First Charge/Discharge Cycle)
Charge: 0 V Constant current/Constant voltage (CCCV) 0.2 mA/cm² 0.04 mA cut-off
Discharge: Constant current (CC) 1.5 V 0.2 mA/cm²
(Result)
FIG. 17 illustrates the first charge and discharge curves of Example 3-1. The result showed an initial efficiency of 81% (Li implantation target was 84%), which was near the target, and the plateau potential during the first charge was 0.22 V. Thus, it has been verified that a Li-pre-doped $SiO_x$ that stably contains lithium was obtained by "Li pre-doping+heat treatment."

The present technology has provided a Li-pre-doped $SiO_x$ that stably contains lithium, and is capable of preventing Li elution, by heat treatment after Li pre-doping. $SiO_x$ is doped with lithium using an electrochemical or organic Li-doping method, after which the lithium is re-diffused by low temperature heat treatment to attach the lithium to oxygen. Good reactivity of lithium with oxygen in nature can prevent Li elution without modification (crystallization) of $SiO_x$ by providing a sufficient re-diffusion temperature or diffusion time. In particular, the present technology is effective for Li doping of a powder material, and enables stable handling of a Li-doped $SiO_x$ powder material, as an active material, in air and with an aqueous binder.

[iv Evaluation of Heat Treated, Li-Pre-Doped $SiO_x$ Powder Material (Example of Another Pre-Doping Technique)]

Example 4-1

A Li-pre-doped negative electrode was produced using a naphthalene catalytic cycle method as follows. A Li coin battery cell was produced in a similar manner to that of Sample 1 except for the foregoing condition.
(Naphthalene Catalytic Cycle Method)
First, 50 mL of tert-butyl methyl ether was introduced into a 100 mL glass container, 2 g of naphthalene was added, and stirring was carried out to dissolve the naphthalene to prepare a colorless and transparent solution. To this solution, 0.9 g of metallic Li foil (0.8 mm in thickness), and 10 g of $SiO_x$ powder were added, followed by stirring for 24 hours using a magnetic stirrer. This procedure was entirely performed in an argon-filled glovebox. After 24 hours has elapsed, the metallic Li foil was completely dissolved and disappeared (Li continuously reacted with naphthalene under catalytic action, and accordingly the metallic Li foil finally disappeared).

Note that this naphthalene catalytic cycle method is likely to cause almost all the lithium to react with naphthalene, therefore enabling the doping level to be controlled by the amount of metallic lithium to be introduced. In this process, theoretically, the oxidation-reduction potential of lithium naphthalenide of about 0.3 V imposes a limitation on potential even if an excess amount of lithium is introduced, causing the Li doping level to be capped at a certain upper limit. Thus, excess doping that leads to, for example, Li deposition can be avoided (deposited lithium would react with naphthalene, and would thus be removed).

After the reaction, the reaction solution was filtered, the container was then sealed, and Li-doped $SiO_x$ was taken out. Then, DMC washing and filtration were carried out (twice) in a dry room, followed by vacuum drying at 80° C. Thus, an intended Li-pre-doped $SiO_x$ powder material was obtained. Note that, in the foregoing step, the Li doping level was adjusted to 15 at %.
(Heat Treatment)
The Li-pre-doped $SiO_x$ powder material obtained was heat treated at 400° C. for one hour using an infrared vacuum furnace. After the heat treatment, by-products (lithium carbonate, lithium hydroxide, organic products) on the surface were removed by water washing and DMC washing. Thus, an intended, heat treated, Li-pre-doped $SiO_x$ powder material was obtained.

Comparative Example 4-1

Figure 18A:
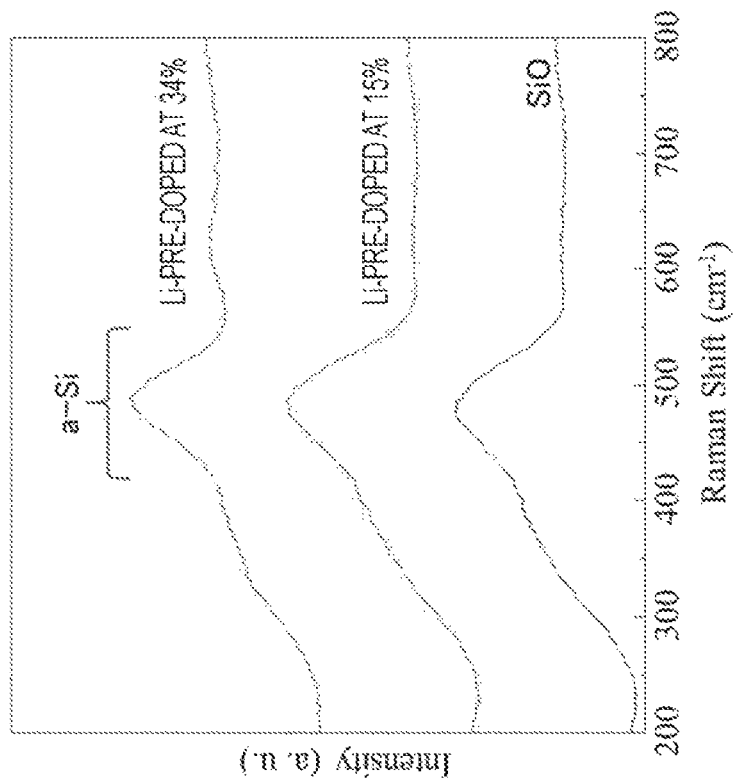
FIGS. 18A and 18B are graphs respectively showing XRD patterns and Raman spectroscopy spectra for Example 4-1, Comparative Example 4-1, and Sample 3.
Figure 18B:
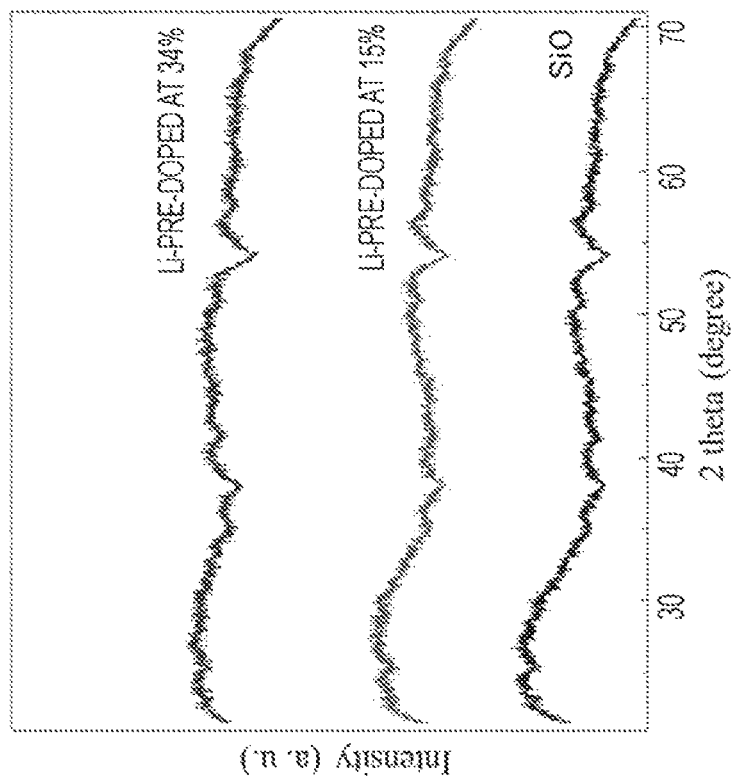
Figure 19:
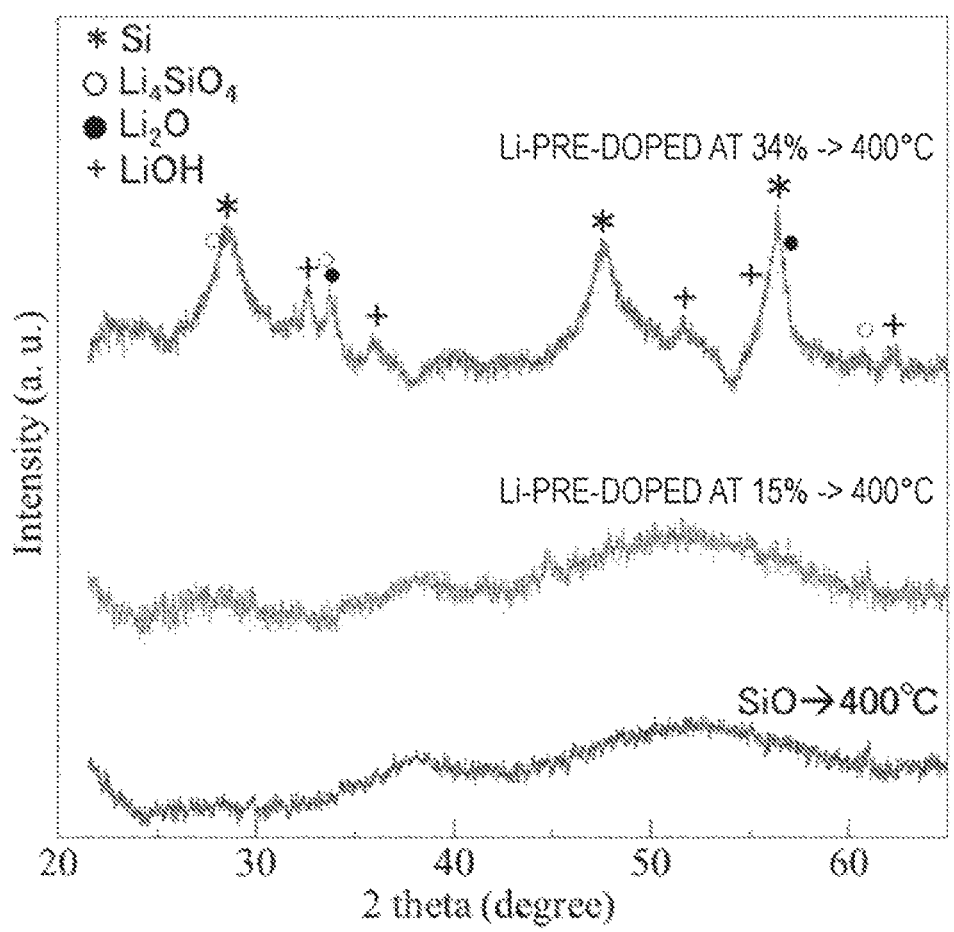
FIG. 19 is a graph showing XRD patterns for Example 4-1, Comparative Example 4-1, and Sample 3.

The $SiO_x$ powder material was used as Comparative Example 4-1.
<Sample 3 (Reference Example)>
A heat treated, Li-doped $SiO_x$ powder material was obtained in a similar manner to that of Example 4-1 except that a different Li doping level (34 at %) was used.
(Evaluation)
(XRD)
The powder materials obtained as described above were evaluated using XRD.
(Raman Spectroscopy)
The powder materials obtained as described above were evaluated using Raman spectroscopy.
(Result)
FIG. 18A illustrates XRD patterns of $SiO_x$ (before heat treatment) and of Li-pre-doped $SiO_x$ (before heat treatment). FIG. 18B illustrates Raman spectra of $SiO_x$ (before heat treatment) and of Li-pre-doped $SiO_x$ (before heat treatment). FIG. 19 illustrates XRD patterns of $SiO_x$ (after heat treatment) and of Li-pre-doped $SiO_x$ (after heat treatment).

From the XRD patterns and the Raman spectra, a comparison between Li-undoped $SiO_x$ and Li-pre-doped $SiO_x$ shows that almost no change is seen from both spectra, but both are in an amorphous state, and doping was provided in a mild manner such that the structure of $SiO_x$ did not change. Meanwhile, among Li-pre-doped $SiO_x$ that had been heat treated at 400° C., crystallization was observed only in Sample 3 doped with 34 at % of Li, and peak analysis provided identification at peaks of crystalline silicon, $Li_4SiO_4$, $Li_2O$, and LiOH.

These results can be explained by the following reaction model. A $SiO_2$ component is known to react with lithium to form $Li_4SiO_4$. In this reaction, reduction reaction takes place to also allow Si to be generated at a same molar ratio as $Li_4SiO_4$ (Equation (4)). In addition, a SiO component generates lithium oxide ($Li_2O$) and Si (Equation (5)). To summarize, Equation (6) holds. The ratio between peak intensities also suggests that $Li_4SiO_4:Li_2O:Si$ has a relationship of 1:1:2, and it has been found that the highly Li-doped one at 34% undergoes reduction reaction of SiO during thermal reaction.

It should be noted that the material doped with 34 at % of Li reacted violently with water without stabilization even after the heat treatment, and thus battery production was not possible. The XRD peak of LiOH is likely due to reaction between eluted Li and water.

$$4Li + 2SiO_2 \rightarrow Li_4SiO_4 + Si \quad (4)$$

$$2Li + SiO \rightarrow Li_2O + Si \quad (5)$$

$$6Li + SiO + 2\ SiO_2 \rightarrow Li_4SiO_4 + Li_2O + 2Si \quad (6)$$

Meanwhile, the results described above suggest a possibility of another novel technology. That is, a combination of the naphthalene catalytic cycle method and heat treatment may allow $SiO_2$ to dissociate to Si or to form $SiO_x$. (Equation (4), (5)). For example, as long as Li infiltration paths are ensured, this technique is likely to achieve uniform reduction also upon application on a porous material or the like since Li can penetrate deep into the material.

Moreover, so far as reduction in takt time is concerned, the reaction mechanism described above is a catalytic cycle, and can therefore be accelerated by heating. For example, sodium naphthalenide has an activation energy of 5 to 10 kcal/mol, and the reaction rate increases by a factor of about eight with a temperature change from 20° C. to 50° C. (P. J. Zandstra et al.). The reaction conditions in the examples described above were restricted to a room temperature and to 24 hours from the viewpoint of safety, but the takt time can be reduced for a process of up to about three hours in a case of reaction at 50° C.

The present technology has been specifically described in terms of embodiments and variations thereof as well as Examples. However, the present technology is not limited to the embodiments and variations thereof as well as Examples described above, but various variations based on the technical spirit of the present technology are possible.

For example, the configurations, the methods, the steps, the shapes, the materials, the values, and the like provided in the embodiments and variations thereof as well as in Examples described above are merely byway of example, and a configuration, a method, a step, a shape, a material, a value, and the like different therefrom may also be used as needed.

In addition, any of the configurations, the methods, the steps, the shapes, the materials, the values, and the like provided in the embodiments and variations thereof as well as in Examples described above may be combined together without departing from the spirit of the present technology.

Moreover, the embodiments and Examples described above have been presented using examples in which the present technology is applied to a battery that contains an electrolytic solution or a gel electrolyte as the electrolyte, but the present technology is not limited to these examples. For example, the present technology is also applicable to an all-solid-state thin-film battery or a bulk-type all solid-state battery.

Furthermore, the embodiments and Examples described above have been presented using examples in which the present technology is applied to batteries having a cylindrical, flattened, prismatic, and coin shapes. However, the shape of battery is not particularly limited. For example, the present technology is also applicable to a flexible battery incorporated in a wearable device, such as a smart watch, a head-mounted display, and iGlass®.

Still furthermore, the embodiments and Examples described above have been presented using examples in which the present technology is applied to a battery having a winding structure, but the structure of the battery is not limited thereto. The present technology is also applicable to a battery having a structure in which a positive electrode and a negative electrode are folded, or are layered one on top of the other, and the like.

Still furthermore, the embodiments and Examples described above have been presented in terms of a configuration in which an electrode includes a current collector and an active material layer as an example, but the configuration of an electrode is not limited thereto. For example, an electrode may be configured to include only an active material layer.

In addition, the present technology can have the configurations described below.

(1)

A negative electrode active material including:
lithium;
a first element consisting of silicon or tin; and
a second element consisting of oxygen or fluorine,
in which
the negative electrode active material contains substantially no compound phase of the first element and the lithium, and contains an amorphous phase containing the first element and the second element, and anionic bond is formed between the lithium and the second element.

(2)

The negative electrode active material according to (1), in which the second element consists of the oxygen, and the negative electrode active material is lithium-containing $SiO_x$ (0.33<x<2) or lithium-containing $SnO_y$ (0.33<y<2).

(3)

The negative electrode active material according to (2), in which a content of the lithium is in a range of from 10 atomic percent to 45 atomic percent.

(4)

The negative electrode active material according to any of (1) to (3), in which the negative electrode active material is in the form of particles.

(5)

The negative electrode active material according to (4), further including:
a coating portion covering at least a portion of a particle surface,
in which
the coating portion contains at least one of carbon, a hydroxide, an oxide, a carbide, a nitride, a fluoride, a hydrocarbon compound, and an organic polymer compound.

(6)

A negative electrode having a negative electrode active material layer containing the negative electrode active material according to any of (1) to (5).

(7)

A battery including:
a positive electrode;
a negative electrode; and
an electrolyte,
in which
the negative electrode has a negative electrode active material layer containing the negative electrode active material according to any of (1) to (5).

(8)

A method for producing a negative electrode active material, the method including:
obtaining Li-doped, Si- or Sn-containing particles by doping, with lithium, Si- or Sn-containing particles containing a first element consisting of silicon or tin, and a second element consisting of oxygen or fluorine; and performing heat treatment on the Li-doped, Si- or Sn-containing particles, in which the heat treatment is performed at 300° C. or above and below 600° C.

(9)

The method for producing a negative electrode active material according to (8), in which the Li-doped, Si- or Sn-containing particles contain an amorphous phase containing the first element and the second element.

(10)

The method for producing a negative electrode active material according to (8) or (9), in which the obtaining Li-doped, Si- or Sn-containing particles is performed by introducing the Si- or Sn-containing particles, together with metallic lithium, into a solution containing naphthalene and a chain ether compound to effect reaction.

(11)

A battery pack including the battery according to (7).

(12)

An electronic device including:

the battery according to (7), the electronic device being supplied with electrical power from the battery.

(13)

An electrically-powered vehicle including:

the battery according to (7), a conversion unit that is supplied with electrical power from the battery, and provides conversion into driving force for the vehicle, and a control unit that performs information processing in relation to vehicle control on the basis of information about the battery.

(14)

An electrical power storage device including:

the battery according to (7), in which the electrical power storage device supplies electricity to an electronic device connected to the battery.

(15)

The electrical power storage device according to (14), further including:

an electricity information control unit that transmits and receives a signal to and from other device via a network, in which the electrical power storage device provides charge/discharge control of the battery on the basis of information received by the electricity information control unit.

(16)

An electrical power system including:

the battery according to (7), in which the electrical power system is supplied with electrical power from the battery, or the battery is supplied with electrical power from a power generator or a power network.

REFERENCE SIGNS LIST

11 Battery case
12, 13 Insulating plate
14 Battery lid
15 Safety valve mechanism
15A Disk plate
16 Thermal resistance element
17 Gasket
20 Wound electrode unit
21 Positive electrode
21A Positive electrode current collector
21B Positive electrode active material layer
22 Negative electrode
22A Negative electrode current collector
22B Negative electrode active material layer
23 Separator
24 Center pin
25 Positive electrode lead
26 Negative electrode lead

The invention claimed is:

1. A negative electrode active material, comprising:

lithium;

a first element consisting of silicon; and a second element consisting of oxygen, wherein the negative electrode active material comprises heat treated lithium-containing $SiO_x$ ($0.33<x<2$), the negative electrode active material contains Si—O—Li bond, the negative electrode active material contains an amorphous state evaluated by X-ray diffraction (XRD), a component ratio of a component including at least two of lithium, the first element, and the second element in the amorphous state is evaluated by X-ray photoelectron spectroscopy (XPS), an ionic bond is formed between lithium and the second element, no peak, in the X-ray diffraction (XRD), due to silicon is substantially observed, and no peak, in a X-ray photoelectron spectroscopy (XPS) analysis of the negative electrode active material, due to a bond component between the first element and lithium is substantially observed.

2. The negative electrode active material according to claim 1, wherein a content of lithium is in a range of from 10 atomic percent to 45 atomic percent.

3. The negative electrode active material according to claim 1, wherein the negative electrode active material is in a form of particles.

4. The negative electrode active material according to claim 3, further comprising a coating portion covering at least a portion of a particle surface, wherein the coating portion contains at least one of carbon, a hydroxide, an oxide, a carbide, a nitride, a fluoride, a hydrocarbon compound, and an organic polymer compound.

5. A negative electrode, comprising:

a negative electrode active material layer containing a negative electrode active material, wherein the negative electrode active material comprises:

lithium;

a first element consisting of silicon; and a second element consisting of oxygen, wherein the negative electrode active material comprises heat treated lithium-containing $SiO_x$ ($0.33<x<2$), the negative electrode active material contains Li Si bond and Si 0 Li bond, the negative electrode active material contains an amorphous state evaluated by X-ray diffraction (XRD), a component ratio of a component including at least two of lithium, the first element, and the second element in the amorphous state is evaluated by X-ray photoelectron spectroscopy (XPS), an ionic bond is formed between lithium and the second element, no peak, in the X-ray diffraction (XRD), due to silicon is substantially observed, and no peak, in a X-ray photoelectron spectroscopy (XPS) analysis of the negative electrode active material, due to a bond component between the first element and lithium is substantially observed.

6. A battery, comprising:

a positive electrode;

a negative electrode; and an electrolyte, wherein the negative electrode has a negative electrode active material layer containing a negative electrode active material, and the negative electrode active material comprises:

lithium;

a first element consisting of silicon; and a second element consisting of oxygen, wherein the negative electrode active material comprises heat treated lithium-containing $SiO_x$ ($0.33<x<2$), the negative electrode active material contains Si—O—Li bond, the negative electrode active material contains an amorphous state evaluated by X-ray diffraction (XRD), a component ratio of a component including at least two of lithium, the first element, and the second element in the amorphous state is evaluated by X-ray photoelectron spectroscopy (XPS), an ionic bond is formed between lithium and the second element, no peak, in the X-ray diffraction (XRD), due to silicon is substantially observed, and no peak, in a X-ray photoelectron spectroscopy (XPS) analysis of the negative electrode active material, due to a bond component between the first element and lithium is substantially observed.

* * * * *